May 2, 1961 L. J. BISHOP ET AL 2,982,227
ENTRANCE SWITCH MECHANISM FOR OVERHEAD CONVEYOR
Filed Dec. 1, 1958 10 Sheets-Sheet 4
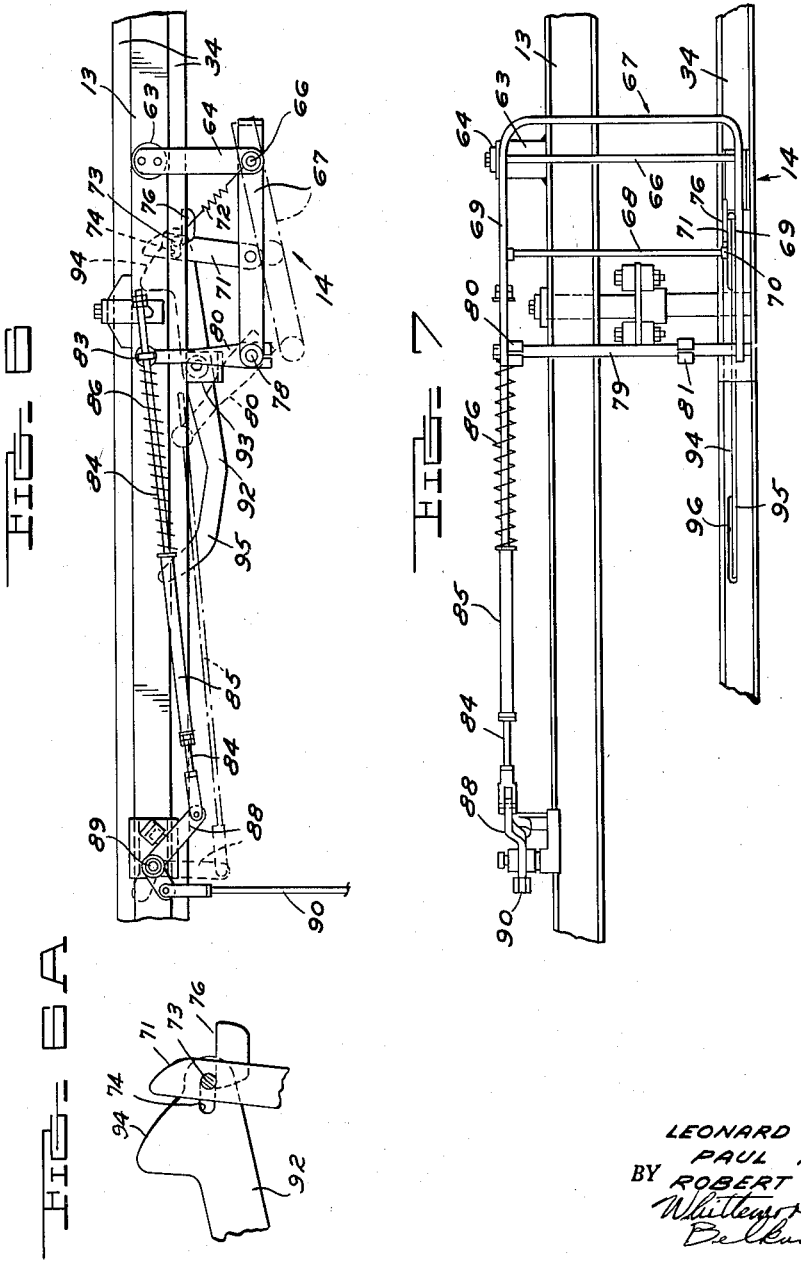
INVENTORS
LEONARD J. BISHOP
PAUL KLAMP
BY ROBERT KRAMMER
ATTORNEYS

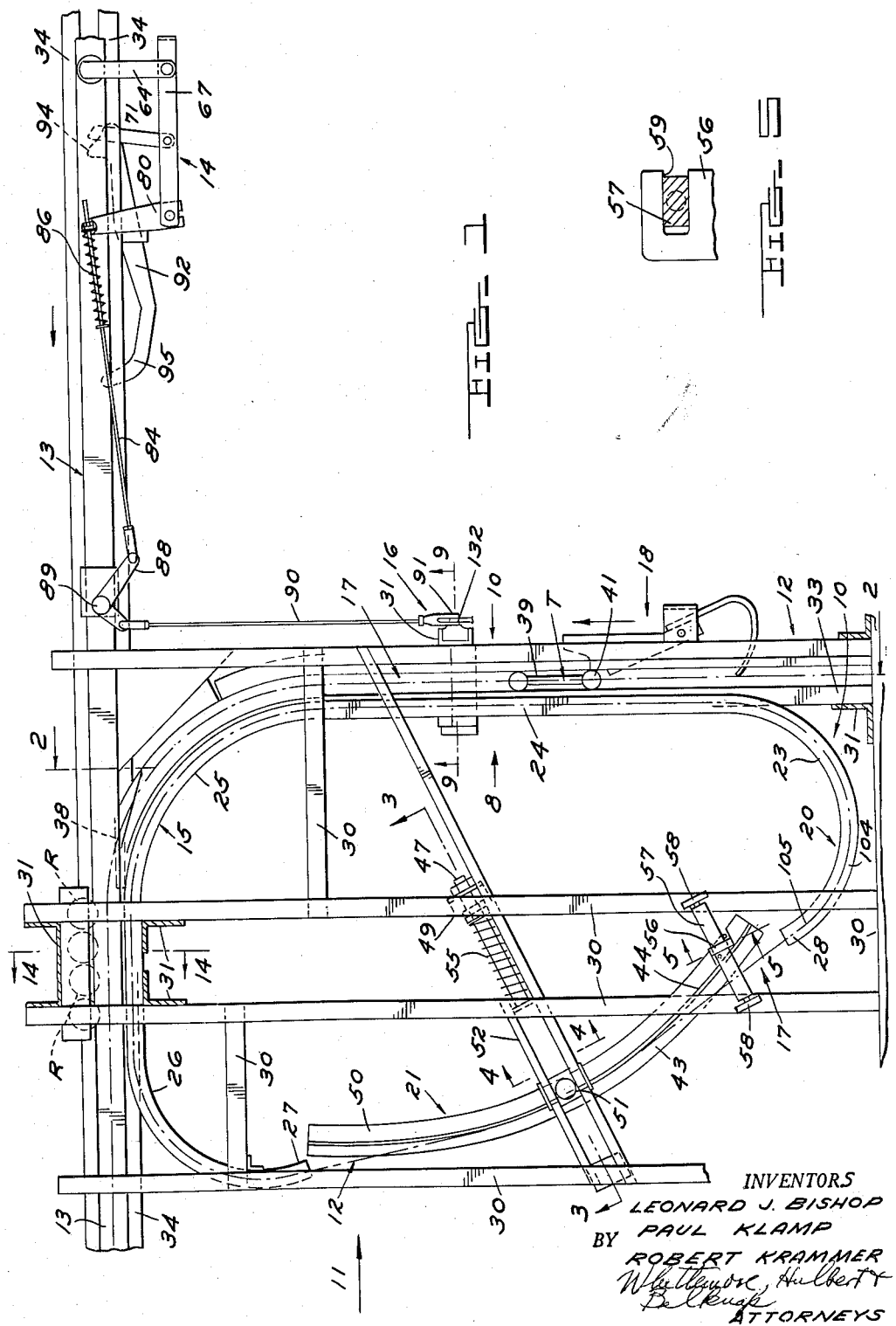

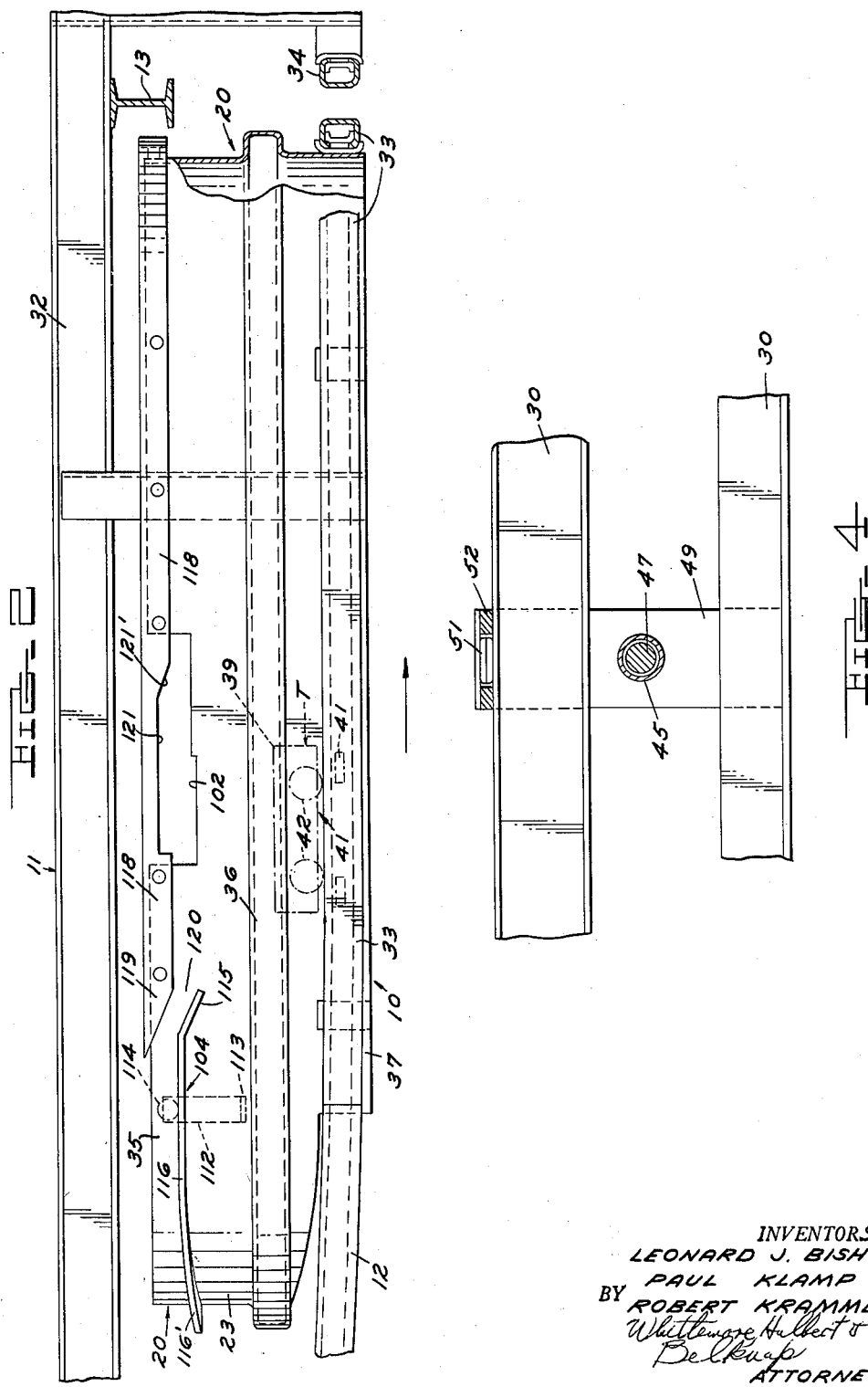

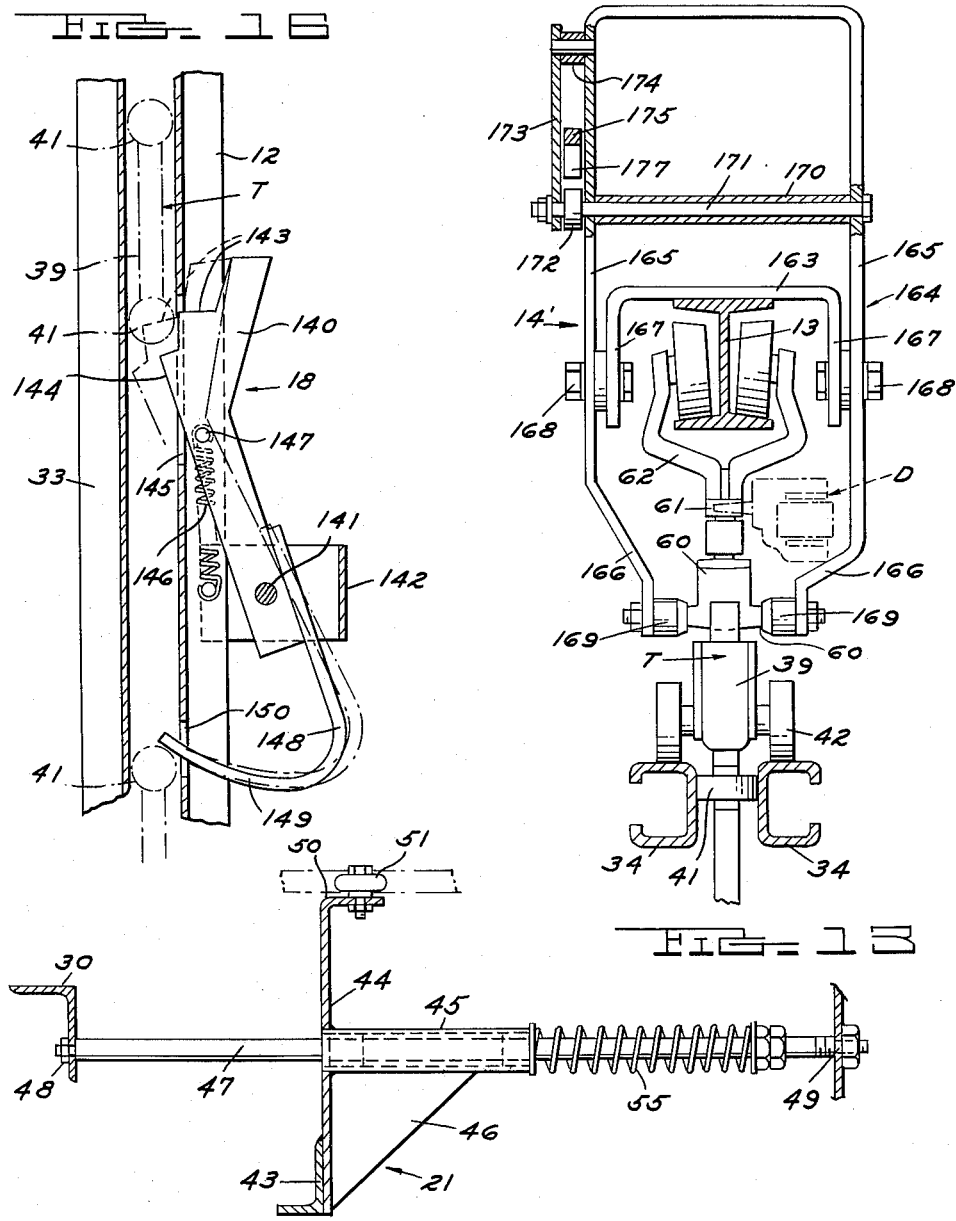

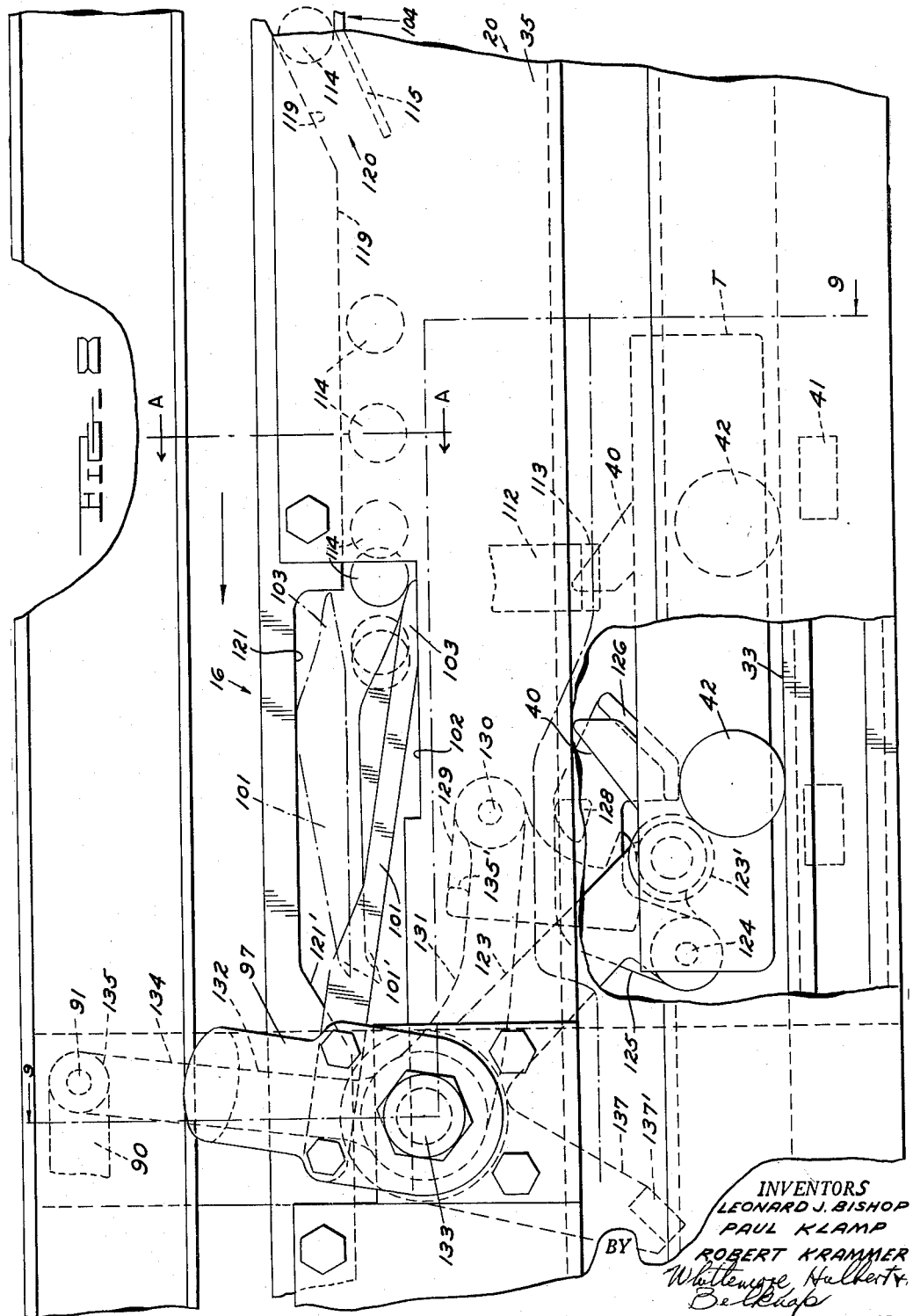

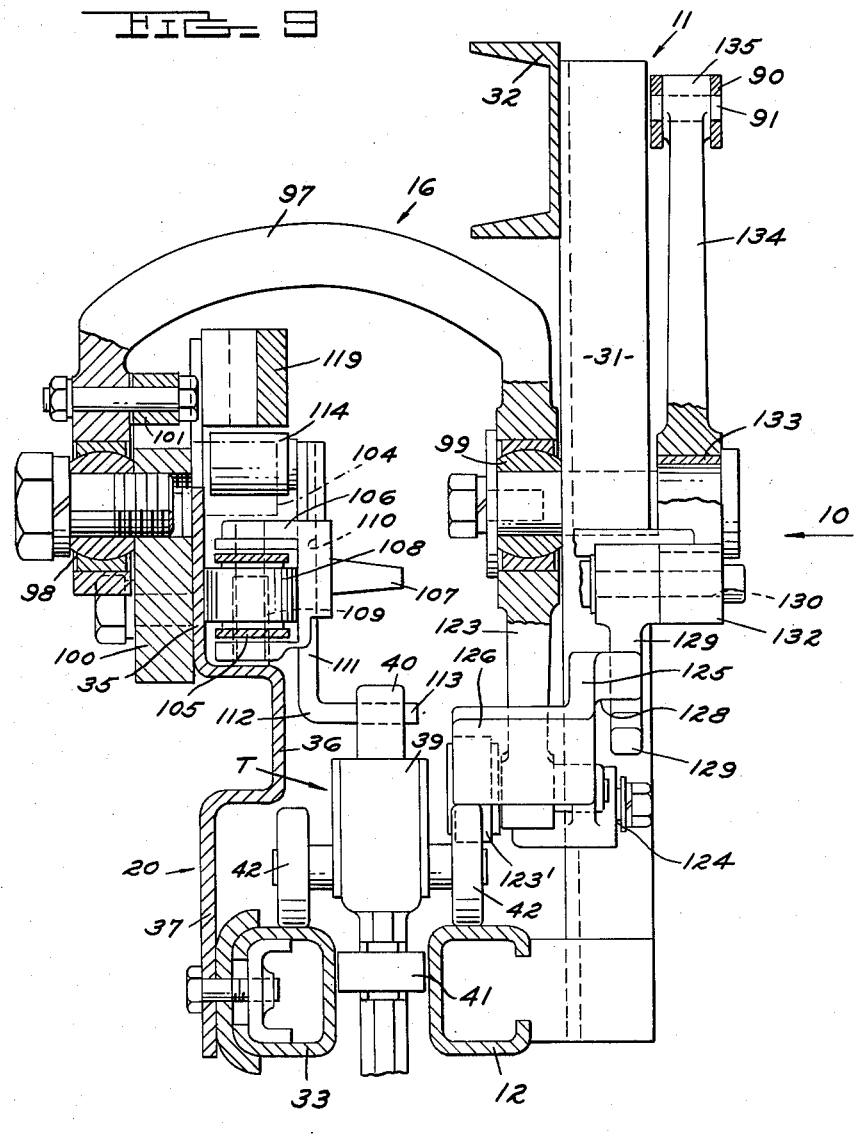

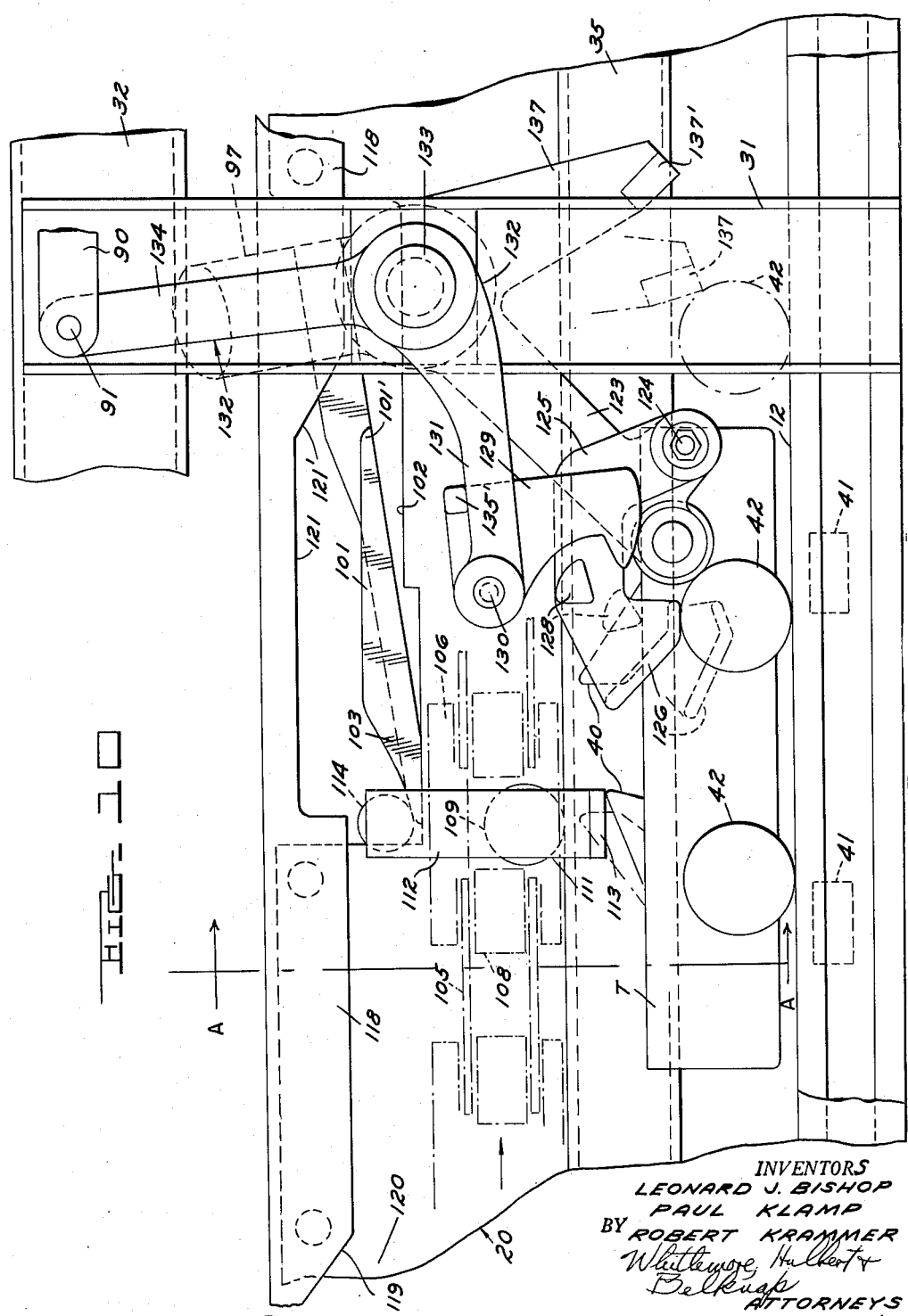

May 2, 1961 L. J. BISHOP ET AL 2,982,227
ENTRANCE SWITCH MECHANISM FOR OVERHEAD CONVEYOR
Filed Dec. 1, 1958 10 Sheets-Sheet 8
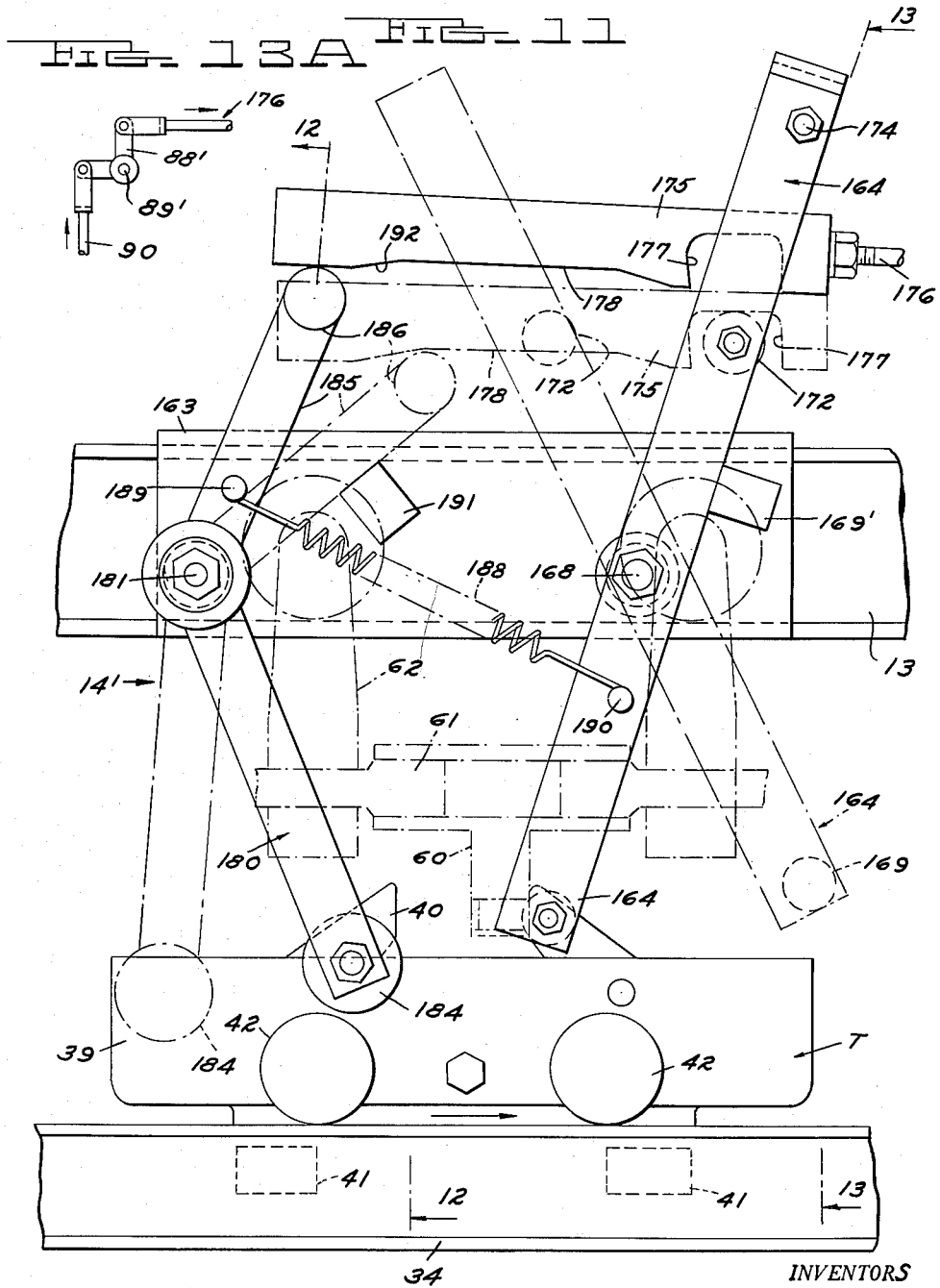
INVENTORS
LEONARD J. BISHOP
PAUL KLAMP
BY ROBERT KRAMMER
Whittemore, Hulbert &
Belknap
ATTORNEYS

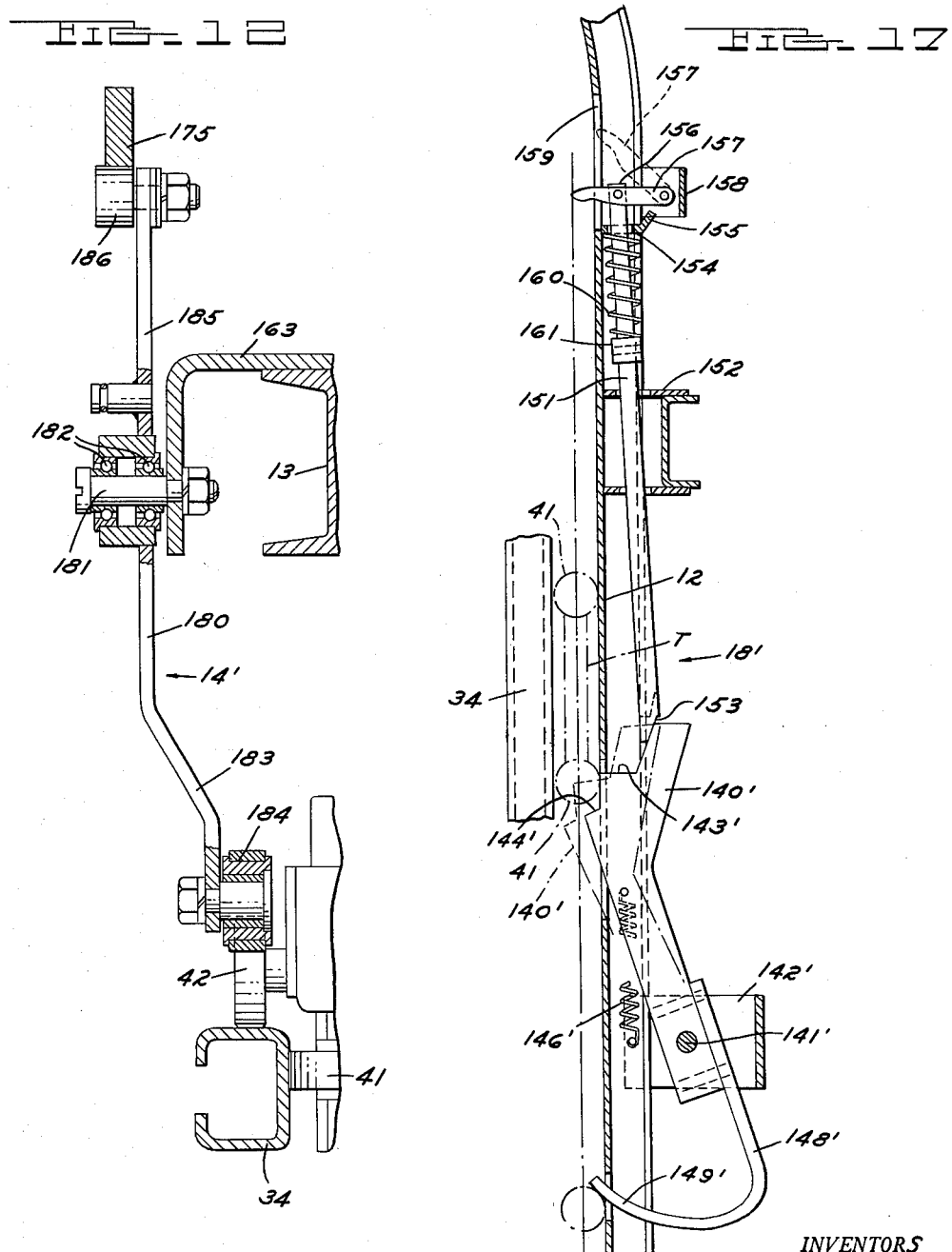

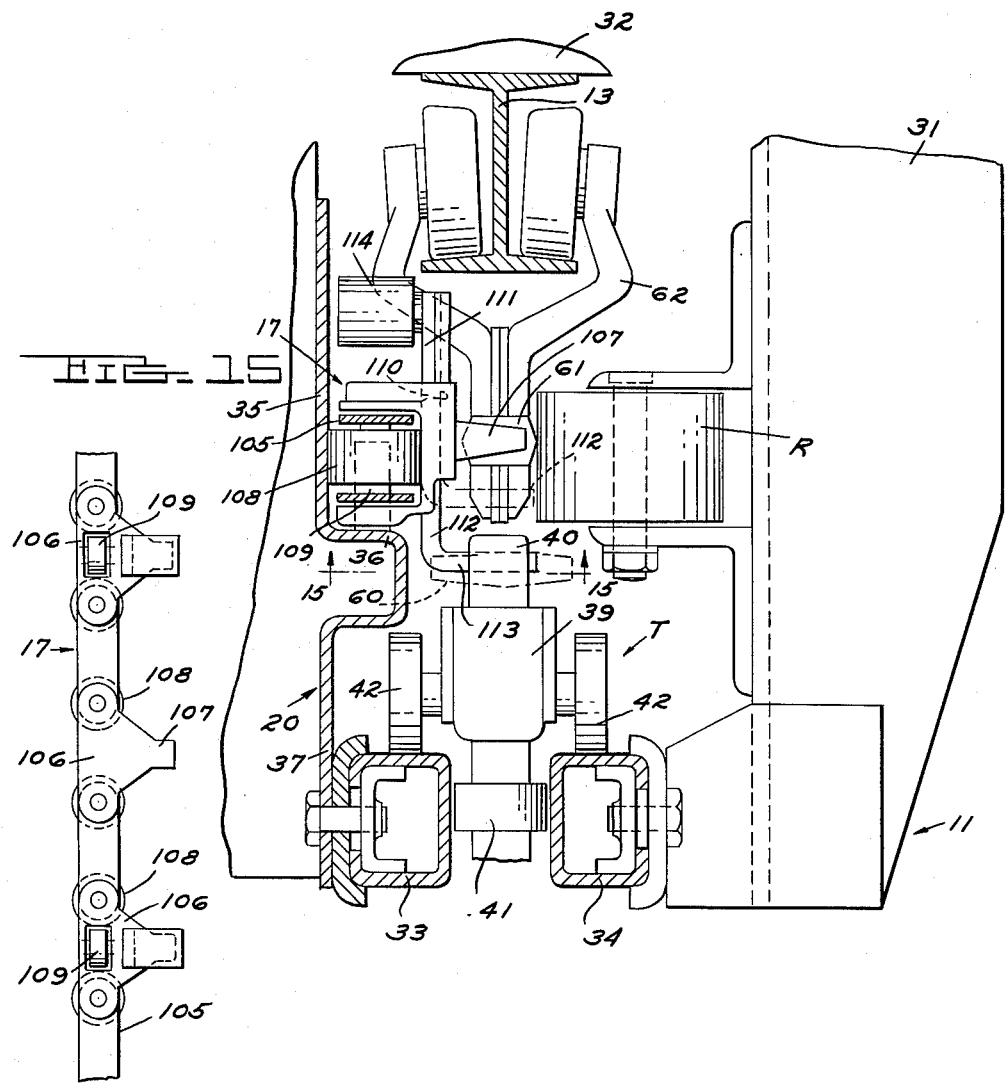

United States Patent Office 2,982,227
Patented May 2, 1961

2,982,227

ENTRANCE SWITCH MECHANISM FOR OVERHEAD CONVEYOR

Leonard J. Bishop, Birmingham, Paul Klamp, St. Clair Shores, and Robert Krammer, Detroit, Mich., assignors to Mechanical Handling Systems, Inc., Detroit, Mich., a corporation of Michigan Filed Dec. 1, 1958, Ser. No. 777,385

50 Claims. (Cl. 104—96)

The present invention relates to an improved entrance switch mechanism for an industrial conveyor, herein illustrated as being of the overhead, power and free type. The mechanism affords an accurately timed re-entry of load carrying trolleys from a free or branch line into a main power conveyor line, on which power chain dogs engage the trolleys and continue their advance.

The mechanism of the present application features improvements over the entrance switch of the power and free conveyor system of a copending application of Leonard J. Bishop and Joel H. Barlow, Serial No. 619,249, filed October 30, 1956, now Letters Patent No. 2,875,703 of March 3, 1959, in that it is effective in a positive way to place relatively lightly loaded trolleys on a free or branch track in a predetermined position for accurately timed forwarding to the main power track, there to be picked up by power conveyor dogs and advanced as described.

It has been found that such lightly loaded trolleys, including the trolley and its bumper assembly, are often of insufficient weight to move or trip a control mechanism governing the release of the trolley for re-entry from the branch track to the main power track, and therefore in accordance with the present invention there is provided a control mechanism in the form of a trolley stop and release device into which the trolley is positively propelled, regardless of its weight, in a way to insure reliable operation of the control mechanism regardless of the weight factor. In accordance with this objective, a positively driven transfer chain powers the trolley to a position in which the latter is stopped by such device, a halted trolley is released from driving engagement by the transfer chain, and is then positively advanced after a pause into the transfer zone of convergence of the branch track with the main track.

It has also been found that, in installations in which the trolley suspends a pivotally mounted load, the inertia of the swinging movement of such load is apt to cause a forward creep of the trolley out of position for proper control as to re-entry by the stop and release device; and the positive halting and further control as to the advance of the trolley, as contemplated by the invention, take care of this inertial tendency, as well as any possibility of an accidental release of the trolley for forward movement from the trolley zone.

It is an object of the invention to provide an entrance switch mechanism of the above type which features an entry transfer chain having caterpillar-type driving engagement with a main power chain, so as to be positively geared in and driven in accurate synchronism with the latter. In association with a transfer chain of this type, the invention provides an improved control including a trolley stop and release device in association with the branch or free track, in the zone of operation of which device the free trolleys are first picked up and positively advanced by the transfer chain, and are there held for subsequent, accurately timed forwarding to the main track. However, improved provision is made to insure that such forwarding occurs only if a main power conveyor dog approaching the re-entry zone is free from driving engagement with a load bearing trolley on the main track, so that jamming of load bearing trolleys converging at the re-entry zone can never take place.

It is by reason of the geared-in, caterpillar drive of the transfer conveyor chain with the main power chain, that the unfailingly accurate feed of a trolley from the branch track onto the main power track is assured. The trolley propelling dogs or like members of the branch track always precede those of the main track conveyor in a predetermined exact forward spacing in common horizontal and vertical planes through the transfer zone. This in turn enables the spacing of the respective dogs on their respective conveyor chains to be made quite close, as compared with existing power and free conveyor installations, with resultant maximum speed and capacity as to load handling in an installation of given size. These features of travel of the conveyor dogs in common vertical and horizontal planes through the transfer zone, under the exact control afforded by the improved stop and release device, and under geared together operation of the two conveyors, are of great importance.

More specifically, it is an object to provide a control mechanism of this type, in which the trolley stop device includes means for disengaging the transfer conveyor chain from trolleys positively advanced by it into the stop zone, by lifting a pusher dog of the transfer conveyor out of driving relation to the trolley. This occurs every time a pusher dog approaches the stop position, except when a trolley is waiting there and an approaching main line pusher dog is initiating a transfer signal. If the signal is a "transfer" one, such as to indicate that the advancing main conveyor dog is not pushing a loaded trolley, then the next following pusher dog of the transfer conveyor will remain and be held down and pick up the waiting trolley at the stop zone. Otherwise the operation is repeated and said following pusher will also be lifted to miss the waiting trolley.

A further object of the invention to the last named end is to provide an improved empty place spotter unit adjacent the main track and in advance of the re-entry zone, this device being operatively connected to the trolley stop and release device to forward to the latter the signal mentioned in the preceding paragraph. Upon receipt of such "transfer" signal the stop device operates to condition the re-entry transfer chain for action. This, as indicated, is accomplished by maintaining the next advancing pusher dog of the transfer chain in a lowered position to engage and forward a branch track trolley, previously halted at the stop zone, into position for driving engagement by the advancing, unoccupied main power conveyor dog.

A further specific object is to provide re-entry control mechanism of the above sort, preferably including a dog carrying transfer chain traversing an endless path convergent with the main and branch line paths and provided with a series of drive lugs projecting laterally for positive driving engagement with links of the power chain, in which no sprockets are employed to drive or guide the movement of the transfer chain. The latter is guided in an endless path by an improved chain track and control cam structure, which also governs the vertical action of the trolley pusher dogs of the transfer chain.

Another object is to provide a transfer mechanism as described above in which trolley engaging pusher dogs of the transfer conveyor chain are in vertical alignment with certain of the caterpillar drive lugs thereof, being controlled by cam provisions of the transfer track structure to be shifted vertically out of and into position for driving engagement with a load trolley halted at the branch track stop zone.

Yet another object is to provide re-entry control and transfer mechanism in which the vertically shiftable pusher dogs of the transfer chain come into engagement with the trolley in the same horizontal and vertical planes in which it is engaged by drive dogs of the main power chain; and in which the shiftable dogs of the transfer chain invariably and precisely lead the dogs of the main power chain in traversing the re-entry zone, thus avoiding interference of the two respective sets of dogs in this zone. This enables a much closer spacing of the dogs from one another on their respective chains than has heretofore been possible, which in turn results in a more rapid and higher capacity handling of loads.

A still further object is to provide a conveyor entrance control mechanism of the sort described, featuring a sprocket-free transfer chain guided by an improved control track structure having all necessary cam and track provisions for governing the action of the dogs of the transfer chain, in which such provisions are embodied, in the main, in a single welded plate unit. This unit is adapted to be fitted easily and at low cost into association with the main and branch track structures of an installation.

Yet another specific object is to provide a transfer chain and track construction as described, including an improved anti-friction chain and improved means for taking up and maintaining proper tension in the transfer chain, without the use of sprockets of any sort.

The invention also affords improvements in the component empty place spotter and trolley stop and release units of the system or mechanism described above.

The foregoing as well as other objects will become more apparent as this description proceeds, especially when considered in connection with the accompanying drawings illustrating preferred embodiments of the invention, wherein:

Fig. 1 is a top plan view showing the general layout of the overhead track structure of the entrance switch mechanism and its relationship to main power and free line tracks of a typical installation;

Fig. 2 is a view of the track structure in vertical elevation and partial section along line 2—2 of Fig. 1;

Figs. 3, 4 and 5 are, respectively, views in vertical section along lines 3—3, 4—4 and 5—5 of Fig. 1, showing features of an improved tension takeup mechanism for the tranfer conveyor chain of the switch;

Fig. 6 is a top plan view showing one version of an empty place spotter device, adjacent the main power line track, adapted to be connected with a trolley stop and release device of the mechanism in the fashion generally shown in Fig. 1, Fig. 6A being an enlarged detail;

Fig. 7 is a side elevational view of the empty place spotter;

Fig. 8 is a fragmentary elevational view, as seen in the direction of the arrow 8 of Fig. 1, of the trolley stop and release device;

Fig. 9 is a view in enlarged vertical section along a line corresponding to line 9—9 of Figs. 1 and 8;

Fig. 10 is a fragmentary elevational view of the stop and release device as seen in the direction of the arrow 10 of Fig. 1;

Fig. 11 is a fragmentary side view showing a modified embodiment of empty place spotter device contemplated by the invention;

Figs. 12 and 13 are, respectively, views in section along lines 12—12 and 13—13 of Fig. 11;

Fig. 13A is a fragmentary plan view showing an alternate bell crank arrangement for use when the empty place spotter of Figs. 11-13 is employed;

Fig. 14 is a view in vertical section approximately along the line 14—14 of Fig. 1, further illustrating structural details and relationships of the main power trolley, the load bearing trolleys, the transfer chain and track structure supporting and guiding these components;

Fig. 15 is a fragmentary plan view of the transfer chain of the invention, as from the line 15—15 of Fig. 14;

Fig. 16 is a fragmentary top plan view of a trolley back stop device associated with the branch or free track at a position generally indicated in Fig. 1; and Fig. 17 is a similar top plan view of an alternative form of back stop device.

The improved entrance switch or control mechanism is generally illustrated, in regard to the relationship of its major components, in Fig. 1 of the drawings. These include, in the order in which they will be discussed as sub-assemblies or component units, a transfer conveyor control and guide track structure, generally designated 10, which is supported by suitable overhead superstructure, generally designated 11, at the junction area of an overhead branch or free track 12 for load bearing trolleys and a main overhead power line or track 13; an empty place spotter unit or device 14 situated adjacent one side of the main track 13, in advance of the re-entry transfer zone 15; a trolley stop and release unit or device 16 located to one side of an extension of branch track 12 which joins the transfer track structure 10 (this device being operatively coupled to and controlled, as will be described, conjointly by trolleys propelled into it and by the empty place spotter 14); the endless transfer conveyor itself, indicated in general in the plan view of Fig. 1 by the numeral 17 applied to the longitudinal center line of its endless chain; and a trolley anti-rebound or back stop device 18 in advance of the trolley stop and release device 16 and on the same side of the track.

Referring first to Figs. 1 through 5 for the general arrangement of the transfer conveyor control and track structure 10, it consists primarily of a fixed horizontal control and track section 20 of special outline to be described, along which the chain of transfer conveyor 17 is guided, and by which the action of its trolley engaging dogs is controlled, and a chain takeup and supplemental track device, designated 21.

As shown in Fig. 2, the track section 20 is preferably formed, in the main, as a one-piece stamping bent to the desired outline and cross-sectional configuration to afford all of the necessary transfer trolley supporting and chain dog control and guide track provisions. Referring again to Fig. 1, track portion 20 includes a curved reach 23 of somewhat less than 180° extent, along which the conveyor 17 is guided in converging to a parallel relationship with the branch track 12; a straight reach 24 extending along this zone; a quadrantal 90° reach 25 around which it comes into parallelism with the main power track or line 13 at the re-entry zone 15; and an arcuate reach 26 departing from zone 15 to guide conveyor 17 in its endless travel.

Track reach 26 terminates at 27 in substantially spaced relation to the nearest adjacent end 28 of the initial arcuate reach 23, and the space between these ends is occupied by the chain takeup and supplemental track device 21.

As shown in Figs. 1, 2 and 3, the superstructure 11 which supports the track 10 and takeup device 21 may comprise a suitable system of welded, horizontally disposed angle irons or channels, including transverse and longitudinal frame and bracing irons 30. All of these parts are ceiling-suspended appropriately, as by a system of hangers 31 of channel or equivalent section and horizontal beams 32 (as shown in Figs. 2, 8, 9 and 10) such as sustains the branch track 12 and main track 13. Preferably, the track section 20 will incorporate a trolley track member 33 (see Fig. 1) which is located in alignment with one of the track ways of the free or branch track 12, and is in effect a continuation of the latter.

As illustrated in Fig. 2 (considered in conjunction with Figs. 8, 9, 10, 13 and 14 in which further conveyor and trolley control mechanism is shown), the main track 13 is a monorail type of the familiar I-beam section sustaining on its bottom flanges the track rollers of chain-driven power trolleys (hereinafter described). The free trolleys T ride the spaced parallel ways 34 of a main line trolley track.

As best shown in Figs. 2, 9 and 14, the track section 20 is preferably fabricated as a single plate-like stamping bent to provide an upright top web portion 35 (in which certain control aperturing is made along the longitudinal reach 24), an intermediate, inwardly bent and horizontal chain guiding track way 36, and an upright bottom web 37, to which the track member 33 may be bolted or welded as an extension of one of the ways of branch track 12.

The track member 33 is brought continuously around the arcuate reach 25 and into the re-entry zone 15 where, as shown in Fig. 14, it coacts with a transversely spaced way 34 of the main track 13 in sustaining the trolleys T. Improvements in overhead track structure of this type are the subject matter of a copending application of Leonard J. Bishop, Serial No. 820,525, filed June 15, 1959.

A suitable track switch tongue or frog 38 (see Fig. 1) is pivoted at the junction of the transfer track reach 25 with main track 13 to support trolleys passing onto the main line. It is desirable that provision be made to sustain the weight of the load on switch tongue 38, by vertically supporting the same on track ways 33 or 34 in either its switching or non-switching position. Provisions to this end are illustrated and described in the Patent No. 2,875,703, to Leonard J. Bishop and Joel H. Barlow identified above.

Trolleys T are entirely conventional, including a body 39 supporting pivotally mounted front and rear restraining and driving dogs 40, vertically journalled guide rollers 41 (Figs. 8, 9, 10 and 14) and rolling on pairs of load wheels 42. The provisions by which loads are supported from trolleys T are also conventional.

The chain takeup and supplemental guide track device 21 is best illustrated in Figs. 1, 3, 4 and 5. It comprises a horizontal arcuate track portion 43 of L-shaped angle iron section, welded or otherwise secured and supported on a similarly arcuate upright plate 44. The plate 44 has a tubular member or sleeve 45 welded to its inner surface, at its approximate longitudinal mid-point and in alignment with an aperture in the plate, and a bracing web 46 is welded between the sleeve and plate to rigidify the construction. Sleeve 45 is slidably guided on an elongated radial rod 47, the outer end of which is secured at 48 to one of the superstructure irons 30; while the inner end of this rod is anchored to a hanger 49 supported by other superstructure irons.

The thus guided plate 44 has an inward flange 50 at its top, and a vertically journalled anti-friction guide roller 51 is provided above this flange, the roller 51 being received for longitudinally guided motion in a laterally confined horizontal way 52, which is suitably supported by superstructure parts 30 above the rod 47. A coil compression spring 55 surrounds rod 47 adjacent the inner or right hand end thereof, as viewed in Fig. 3, acting between a washer anchored on the rod and the end of sleeve 45 to urge the plate 44 to the left. Thus the takeup device 21 exerts continuous tensioning action on the transfer chain 17 while the latter is supported and guided by the track portion 43, as schematically indicated in Fig. 1.

Referring to Fig. 5 in conjunction with Fig. 1, the movements of plate 44 are stabilized and its plane of movement is kept horizontal by the sliding engagement of an upright bracket 56 welded to its top flange 50 with a horizontal guide bar 57 having its ends fixedly supported by further brackets 58 on superstructure parts 30. A horizontal slot 59 of the stabilizing bracket 56 has fairly close vertical sliding clearance relative to the top and bottom of bar 57.

*Empty place spotter unit*

This device is generally designated 14 and a preferred embodiment thereof is illustrated in Figs. 1, 6 and 7 of the drawings. Its function is to transmit a mechanical signal to the trolley stop and release device 16 of Fig. 1 (hereinafter described) only when a main power conveyor drive or pusher dog unoccupied by a load bearing trolley approaches re-entry zone 15 along the main track of the installation. Such main line drive dog appears in dotted line in Fig. 14, being designated 60, and is also shown in Figs. 11 and 13 which deal with an alternative form of empty place spotter. Dogs 60 conventionally depend from links of a driven power chain 61 (Figs. 11 and 13) supported by trolleys 62 riding the flanges of the main line track 13. Chain 61 is conventionally driven by a mating caterpillar drive device D shown in dotted line in Fig. 13.

As shown in Figs. 1, 6 and 7, the device 14 essentially comprises a yoke-like linkage pivotally mounted on and to one side of the main track 13. To this end, the I-beam 13 has an upright boss 63 welded to the top of its upper flange and a rigid arm 64 fixedly secured to the top of the boss projects laterally of the track. A vertically elongated rod 66 is carried in depending relation to the outer end of arm 64, extending downwardly to the side of one of the load trolley track members or ways 34 of the main track, and being similarly braced at its lower end in relation to that track member.

Vertical rod 66 serves as a pivotal support for a swinging yoke 67 of laterally disposed U-shaped outline (Fig. 7); and a vertically elongated brace rod 68 extends between the arms 69 of the yoke 67, being secured at its ends to the horizontal arms of the latter. Rod 68 provides a pivot at 70 for a swingable arm 71, which extends laterally inwardly through a slot in the adjacent load trolley track member 34 and well into the path of the vertically journalled guide rollers 41 on the trolleys T, which operate between the opposed vertical webs of the track members 34.

A coil spring 72 acts between a pin 73 on arm 71 and a fixed anchor on the fixed rod 66 to urge the arm 71 clockwise, as viewed in Fig. 6. The pin 73 is guided in a short horizontal slot 74 in an elongated secondary throwout and reset arm 92, to be described. Pin 73 normally engages a fixed latch element 76 on the adjacent track member 34, so that in the absence of a load bearing trolley T being propelled by a main line dog 60 along load track members 34 nothing happens; and the pivoted arm 71 retains its solid line position of Fig. 6. The remaining parts of the empty place spotter 14 then come into play, in a manner to be described, to forward the intended mechanical signal to the trolley stop and release device 16 which will enable a trolley waiting on the branch line to be forwarded to re-entry zone 15.

The outer ends of the yoke 67 are connected by a third vertically elongated rod 78 which serves as a pivot for a vertically elongated sleeve 79. This sleeve has fixedly mounted thereon, in vertically spaced relation to one another, a pair of operating arms 80 and 81. The lower arm 81 extends inwardly over the space between the load track members 34, at a sufficient elevation to clear trolleys T traveling therealong, but to be engaged and operated by a pusher dog 60 of the power chain 61 of the installation. The other and upper operating arm 80 is positioned above the main track 13, where it is coupled by a swiveled connection at 83 with an elongated thrust rod 84. The rod 84 is fixedly received in a sleeve 85 and is surrounded by a coil compression spring 86 which acts between the swiveled connection 83 and the end of sleeve 85 to urge the thrust rod 84 to the right, as viewed in Figs. 1, 6 and 7. Sleeve 85 is adjustable axially on rod 84 to vary the force of spring 86.

Accordingly, as the lower arm 81 is engaged by an advancing power trolley dog 60 (unoccupied by a load bearing trolley T), the rod 84 is shifted longitudinally to the left and power is transmitted, through means to be described, to stop and release unit 16 to release a trolley.

However, in the event the advancing power dog 60 is occupied by a load bearing trolley, the forward guide roll 41 of the latter will engage pivoted arm 71, swinging the latter counterclockwise as viewed in Fig. 6, and thereby disengaging its pin 73 from the fixed latch member 76.

The further result is that the yoke linkage of unit 14 is swung counterclockwise by the trolley about the pivot rod 66 for yoke 67 to the dot-dash position of Fig. 6, thus positioning the operating arms 80, 81 in the corresponding position, in which the power chain dog 60 misses engagement with the latter arm 81 and no force transmitting motion of the thrust rod 84 takes place. The stop and release unit 16 remains in a condition to halt a trolley on the branch track, in a way to be described.

The end of the thrust rod 84 is pivoted to one arm of a bell crank 88 pivoted at 89 atop the track beam 13; and another and shorter arm of this bell crank has an elongated pull rod 90 pivoted thereto. The opposite end of pull rod 90 is pivotally connected at 91 (see Figs. 1, 8, 9 and 10) to the trolley stop and release device 16 to operate the latter, as will be described.

In order to reset the empty place spotter mechanism to its solid line position of Fig. 6 for similar signaling (or not), an elongated throwout and reset arm 92 referred to above (Figs. 6 and 7) is medially pivoted on a vertical axis by a bracket 93 at one side of a load track member 34. One of its functions is to insure that the pin 73, as moved to the left by a trolley advanced by a main line pusher, will not hang up on the end of the fixed latch 76; and to this end the rear end 94 of this arm is curved in shape for camming engagement by the guide roll 41 of that trolley, after it has swung arm 71, as described. Thus arm 71 and yoke 67 are positively driven through the pin and slot connection 73, 74 to the dot-dash release or throwout position of Fig. 6, the arm 71 moving outwardly from track 13 in a direction at 90° to the latter, so as to instantly clear the trolley.

The other function of arm 92 is to restore the empty place spotter to its original position; and this is done when the forward trolley guide roller 41, having signaled at the spotter device 14, engages and outwardly moves a forward incurved extremity 95 of the reset arm 92. This extremity projects through a slot 96 in the track way 34 into the line of movement of the guide roller 41. The resultant counterclockwise motion of arm 92 is effective through its connection at slot 74 with the pin 73 on arm 71 to swing yoke 67 clockwise and re-engage pin 73 behind the fixed latch 76, the arm 71 being urged clockwise about its own pivot by spring 72.

*Trolley stop and release device*

The device 16 is illustrated in Figs. 8, 9 and 10 of the drawings, and its function is to control the stopping and accurate positioning of each trolley T adjacent the transfer unit 10 of free or branch track 12, as the trolley is advanced by transfer chain 17 into a stop zone. As indicated above, the device 16 releases the trolley responsive to a signal forwarded by the empty place spotter 14, i.e., when an advancing power conveyor dog 60 is not occupied by a load bearing trolley. The presence of the positive-acting stop and release mechanism 16 is dictated by the fact that the installation may be handling relatively light loads whose impetus alone is not sufficient to operate another type of control mechanism. In such case it is desirable to advance the free track trolleys forcibly into the control zone, a function here performed by the transfer conveyor chain 17, under control by mechanism 16.

The mechanism 16 includes a swinging yoke member 97 which, as illustrated in Fig. 9, is of generally inverted U-shaped outline. It is mounted to swing in a vertical plane paralleling the branch or free track on bearings 98 and 99 which are, respectively, carried by a spacer 100 secured to the top web portion 35 of the one-piece track member or section 20, and to an upright member 31 of the supporting superstructure 11. One arm of the yoke 97, as shown in Figs. 8 and 10, fixedly carries a rearwardly projecting, plate-like control cam 101 on its inner side. Cam 101 is received in a recess 102 formed in the top of the upright web portion 35, and is extended in width at its rear portion 103, which normally rests on the top edge of the recess 102, to provide a tongue-like cam formation.

Referring to Fig. 2 in conjunction with Fig. 8, a cam track 104 is welded on the outer surface of the track section 20, upon which cam track the pusher dog follower rollers of the transfer conveyor 17 are adapted to roll.

It is now in order to refer briefly to Figs. 9, 14 and 15 for structural features of the transfer conveyor 17 and its driven and pusher dogs. As shown in Figs. 14 and 15 (see also Fig. 1), the conveyor 17 is an endless chain 105 having links 106 certain of which are of special character. Each of the links 106 is provided with an integral, laterally outwardly extending dog or lug 107, which engages a link of the main power chain 61 as the two chains travel side by side through the re-entry zone. It is thus seen by reference to Fig. 1, that there are always a number of dogs or lugs 107 in driven, caterpillar engagement with the chain 61 in this zone, for optimum transmission of power to the chain 105 of transfer conveyor 17, and its timing relative to the main line conveyor is positive and very accurate. This enables the very close spacing of conveyor trolley propelling dogs referred to above.

At the points of articulation of its links the chain 105 is equipped with vertically journalled antifriction rollers 108, which bear against the top web 35 of track section 20, as well as against the plate 44 of its tension take-up device 21. Each of the special drive links 106 is further provided with a horizontally journalled anti-friction roller 109, which rides the top of the integral track way 36 of the track section 20.

Certain of the special drive lug carrying links 106 of chain 105 are additionally equipped, inwardly of their respective drive lugs 107, with integral, vertically extending guide ways 110, in each of which the upright shank or body portion 111 of a special drive dog 112 is slidably received. These dogs have laterally out-turned driving feet 113 which, as best shown in Figs. 9 and 10, are adapted to come into trolley propelling position between the pivoted front and rear dogs 40 of the load trolleys T when the transfer chain drive dogs 112 are in the lowered position of Figs. 9 and 14. They are limited so as not to fall below this position by suitable stop or spacer means thereon (not shown) which engage the top of the chain link 106.

The vertical position of the dogs 112 is controlled by the fixed cam track 104, each of the dogs 112 being provided at the top of its shank with a horizontally journalled, inwardly extending cam follower roller 114, which rides the track 104. The lowered position of the transfer chain pusher dog 112 is shown in full line in Fig. 14, where the dog traverses the re-entry zone 15 of the installation; and interference in this zone with the driving dog 60 of the main power chain (also shown in dotted line in Fig. 14) is avoided by spacing the dogs 112 so that they unfailingly and predeterminedly lead the dogs 60.

As illustrated best in Figs. 2 and 8, the cam 104 terminates at 115 just to the rear of the trolley stop and release mechanism 16 (in reference to the direction of movement of the trolleys indicated by the arrow). The track terminal 115 is downwardly inclined from a short horizontal portion 116, with which an upwardly inclined rear ramp portion 116' merges. This ramp portion 116', commencing at the end 28 (Fig. 1) of the track reach 23, is one onto which the follower rollers ride after leaving the take-up device 21, it being understood that as the dogs 112 traverse and leave the re-entry zone 15 and track reach 26 they are in the lowered position.

Again referring to Figs. 2, 8 and 10, the track section 20 has an elongated horizontal hold-down rail 118 bolted or otherwise secured thereon, for the purpose of insuring that the dogs remain in their lowered position in zones where this is intended. Rail 118 commences at a rear portion 119, in which its bottom surface is beveled parallel to the inclined terminus 115 of cam track 104, thus providing a chute 120 into which the follower rollers 114 pass in a vertically restrained manner.

In departing forwardly from the chute 120 the dogs 112 are in their fully lowered position shown in Figs. 8, 9, and 10, being placed in this position by the rail portion 119 and being thereafter held so by the rail, except in the zone 121 a short distance from the chute 120. At this zone the bottom of the rail 118 is upwardly recessed to accommodate the rearwardly extending, tongue-like portion 103 of plate cam member 101 in the upwardly swung position of the latter shown in dotted line. The forward end of the recess 121 is downwardly inclined at 121' to again positively lower the dogs 112 after their rollers 114 traverse the recessed zone; and the rail restrains them in this position throughout the remainder of the forward length of track plate or section, including the re-entry zone 15.

As shown in Fig. 14, the main line power chain 61 is backed up at the zone 15 by a series of rollers R journalled vertically by the superstructure 11, in order to improve stability in the transmission of power to the chain 105 of transfer conveyor 17.

As shown in Figs. 8 and 10, when the tongue-like plate cam 101 is in its elevated position (dotted line in Fig. 8) the cam follower rollers 114 of the transfer chain pusher dogs 112 travel therebeneath, and the dogs 112 are held downwardly by the bottom of cam tongue portion 103 in traversing the zone of recess 121, so as to take propelling engagement with the forward pusher dog 40 of any trolley T awaiting the same at the stop and release mechanism 16.

This is on the assumption that a signal has been received from the empty place spotter 14 which in effect notifies the mechanism 16 that a main line pusher dog 60 is approaching re-entry zone 15 unburdened by a trolley. With such signal the waiting transfer track trolley is picked up by the lowered dog 112 and propelled in exactly timed fashion to the re-entry zone, to be there picked up by the signaling dog 60.

However, if no such signal is received the cam 101 of stop and release unit 16 is lowered to the full line position of Figs. 8 and 10, the dog's follower roller 112 rides up the cam tongue portion 103, the dog 112 is elevated so that its propelling foot 113 passes over the dogs 40 of the waiting trolley, and the latter remains unmoved until a proper signal is received.

In order to control movements of cam 101, a second arm of the U-shaped yoke 97 of mechanism 16, pivoted to the superstructure at 99, as shown in Fig. 9, is provided with an integral, downwardly extending extension arm 123, on the free end of which a trolley stop roller 123' is horizontally journalled. Roller 123' is adapted to engage one of the forward load rollers 42 of a trolley T advancing into the stop zone adjacent recess 121. The yoke extension arm 123 is also offset adjacent roller 123' to provide a pivot at 124 for a further short swingable arm 125. Arm 125 carries an inclined shoe 126 at its free end, which shoe is engaged by the advancing trolley load roller 42 prior to its engagement with the stop roller 123, thereby to swing arm 125 slightly upwardly to the position of Figs. 8, 9 and 10. Arm 125 is also equipped with a laterally projecting lift lug 128 whose function will appear.

The lug 128 is located on arm 125 for upward engagement by a lift hook member 129 which is pivoted at 130 on one arm 131 of a bell crank 132. This bell crank is pivotally mounted on the superstructure at 133, coaxially of the pivot bearings 98 and 99 for the yoke 97.

The other arm 134 of bell crank 132 extends upwardly, its outer terminal being provided with an apertured boss 135, and the pull rod 90 operated by the empty place spotter of Figs. 1, 6 and 7 is pivotally connected to the bell crank arm 134 at this point, previously designated 91. Counterclockwise (Fig. 8) gravitational movement of hook member 129 about its pivot is limited by a stop lug 135' thereon engaging the arm 131 of bell crank 132.

Accordingly, upon operation of the bell crank 132 by a mechanical signal applied through the thrust rod 84 of the empty place spotter and the pull rod 90, the bell crank is swung clockwise, as viewed in Fig. 10 (counterclockwise in Fig. 8). In the event that a trolley T is not present and stopped at the stop zone 121, the arm 125 and its lift lug 128 are in their lowered, dotted line position of Fig. 10, and the upward swing of the hook member 129 as it swings with bell crank 132 does not engage it with the lift lug 128. As a result bell crank arm 123 is not turned (clockwise in Fig. 10) and the cam plate 101 remains in its bottom position.

In this way the next drive or pusher dog 112 will be lifted and will be unable to engage a trolley which arrives after the release signal is given. Furthermore, the stop roller 123' stays in its lower position to insure that a trolley which arrives after the release signal occurs will be stopped.

In other words, every trolley entering the stop and release device 16, under positive propulsion as described, will be halted by the stop and release device, and a trolley will not be released by the device 16 unless it reaches the stop position before the release signal is given. Otherwise, a trolley carrying a load and arriving at a higher speed could pass beneath the chute 120 before a pusher dog 112 and its roller 114 traverse this zone, stay head of the dog, reach the release mechanism stop roller 123' just as it is released and roll ahead to engage a preceding, wrong dog. It is also desirable to halt each trolley to enable a diminution or stoppage of swing of a load pivotally suspended thereon, since the inertia of such movement would also tend to occasion a forward creepage of the trolley out of position for control by device 16. The normal position of a pusher dog 112 at the time a signal is received by the device 16 is approximately at A—A in Figs. 8 and 10.

However, with a trolley T present and stopped by roller 123', as shown in Figs. 8, 9 and 10, the lug 128 has been elevated by the latter to its solid line position; and the next mechanical signal transmitted from the empty place spotter, causing the yoke 97 and bell crank 132 to be swung clockwise about 15°, as viewed in Fig. 10, will first engage the hook 129 beneath the lift lug 128 in the initial 6° of movement, and the further lift of about 9° elevates the stop roller 123' on yoke arm extension 123 of blocking relation to the waiting trolley T.

This swing of the yoke 97 causes the cam 101 to move upwardly from its solid line position of Fig. 8 (in which it cams the chain dog follower rollers 114 upwardly to elevate the dogs 112 out of driving engagement with the trolleys) to the dotted line position in rail recess 121, in which it serves to hold the dogs 112 in the lowered position of Fig. 8. The result is that the propelling foot 113 of the next dog 112 overtakes the halted trolley and advances the same toward the re-entry zone 15 and main track ways 34.

When the release signal occurs and the yoke 97 swings clockwise, as viewed in Fig. 10, the roller 114 must be to the left of the tip of cam 101 to allow the cam to rise before the roller enters the space under the cam. However, as the yoke 97 swings clockwise, the trolley stop roller 123' is lifted and released. The roller 114 and pusher dog 112 have not as yet come up to the waiting trolley at this moment. If at this time an operator should inadvertently move the load suspended from the trolley in a forward direction, the trolley could travel far enough ahead to come in engagement with a pusher dog 112 at one spacing ahead of the intended pusher dog.

In such case the trolley would enter the converging re-entry zone 15 too early, and the load suspended from the trolley could collide with the load on the trolley ahead of it. This is particularly the case when the trolleys and loads are closely spaced on the power and free lines. Since an important feature of the type of entrance switch herein described is that the mechanically connected elements permit entry into a closely spaced line of traffic, provision is made to prevent such accidental movement of the trolley from the stop position to the preceding pusher dog in the following manner.

Yoke 97 is provided with an additional integral arm 137, on the end of which is a stop 137' which extends sideways from the arm into the path of one of the leading trolley rollers or wheels 42. When the yoke 97 swings clockwise Fig. 10, to release the trolley, stop 137' swings downward into the path of the trolley wheel. If the trolley is pushed ahead at this moment by means other than the pusher dog, it again comes to a halt against stop 137' to wait for the pusher dog to engage it. This is further insurance against accidental movement of the trolley, as by an inadvertent push by a workman, past the proper control position.

When the empty place spotter 14 returns to its inoperative position pusher dog roller 114 (Fig. 10), while riding under cam 101, prevents the yoke 97 from returning to its stop position until the roller clears the end 101' of cam 101. Now the pusher dog which carries roller 114 has advanced to a position where it is in coupled engagement with the trolley pusher dogs. The yoke now turns back to its initial position through the action of its unbalanced weight distribution, and as a result stop 137' is retracted at the precise moment when pusher dog 112 begins to push the trolley. Thus the release mechanism 16 is rendered foolproof, so that even with accidental manual manipulation of the load suspended from the trolley in the stop position, trolley engagement with any but the intended pusher dog is prevented.

*Anti-rebound back stop device*

A preferred embodiment of the anti-rebound or trolley back stop device 18, appearing in Fig. 1, is shown in greater detail in Fig. 16 of the drawings. It comprises a swinging arm 140 of angular outline which is pivotally mounted at 141 on a side bracket 142 secured to one of the branch track ways 12, somewhat to the rear of the trolley stop and release mechanism 16 (Fig. 1). The forward end of the arm 140 is formed to provide a lateral abutment 143 adapted to come into position beside the rearmost vertically journalled guide roller 41 of a trolley T, thus to place and hold the arm 140 in the full line position of Fig. 16, in which the shoulder 144 backstops the trolley; and a further shoulder or lug 144 across which the trolley guide rollers 41 ride with the effect of swinging the arm 140 clockwise, as viewed in Fig. 16, to the position mentioned. The track way 12 has an elongated slot 145 in which the forward portion of arm 140 is received in such movement; and a coil tension spring 146 anchored between the bracket 142 and a pin 147 on the arm 140 urges the latter for counterclockwise movement into the slot 145.

The rear portion of arm 140, adjacent its pivot 141 has a resilient stop arm 148 of spring steel rod stock welded or otherwise secured thereto, this spring arm terminating in an inwardly curved end portion 149 which extends through a further and relatively short slot 150 in the track member 12, so that, in the innermost, solid line position of stop arm 149, it extends in front of the foremost guide roller 41 of a trolley trailing the one halted at the stop and release station.

Coil spring 146 tends to hold arm 140 in the dotted line position where its end portion 149 is clear of the track to let an approaching trolley pass. When the trolley engages the forward end of arm 140, the front guide roller 41 of the trolley rotates the arm clockwise. When the trolley reaches the stop position, the arm is swung back part way by spring 146, so that abutment 144 moves in behind the rear guide roller 41 of the trolley. This prevents rebound and consequent disengagement of the right front trolley wheel from shoe 126 (Fig. 10).

Now the spring arm portion 149 acts as a resilient stop for the succeeding trolley, cushioned by the inherent flexibility of a portion 149. As a result only one trolley at a time can be moved out of the stop position. The back stop mechanism holds the second trolley far enough back that it cannot reach the stop roller 123' before the latter is reset. When the first trolley clears the back stop device 18, spring 146 returns the latter to the dotted line position so that the second trolley can advance to the stop.

A somewhat similar anti-rebound device is shown in an alternative form in Fig. 17, the device here being generally designated 18'. To the extent of the similarity, corresponding parts are designated by corresponding reference numerals, primed, and further explanation thereof is dispensed with. Here, the back stop arm 140' is employed in association with an elongated rod 151 which is guided in a bracket 152, secured to the track member 12 for vertically restrained, laterally shiftable action. The rear end of the rod 151 is formed at 153 for latching engagement with an adjacent end of the swingable arm 140', and its forward end extends through a recess 154 in a further bracket 155 on track member 12. Forwardly of the recesses it is pivotally connected at 156 to a tappet member 157 pivoted on a track member bracket 158.

Tappet member 157 extends through an elongated slot 159 in the track member 12, and is adapted to be swung to the dotted line position of Fig. 17 upon engagement by the foremost guide roller 41 of the trolley T. A coil compression spring 160 surrounds rod 151 adjacent the forward end thereof (upper end as viewed in Fig. 17), this spring acting between the bracket 155 and a collar 161 on rod 151 to urge the latter rearwardly, or downwardly, as viewed in Fig. 17.

In operation, the arm 140' acts in the manner of the corresponding arm 140 of the form of Fig. 16; however, it is latched by the rod 151 in a retracted, solid line position, and is not released for return to the fully inward dotted line position until the rod 151 has been shifted (upwardly as viewed in Fig. 17) by trolley engagement with the tappet 157.

An alternative form of empty place spotter mechanism, whose function is the same as that of the mechanism 14 of Figs. 1, 6 and 7, is shown in Figs. 11, 12 and 13, being generally designated therein by the reference numeral 14'. The direction of movement of the trolley T on the members or ways 34 of the main line trolley track, as propelled by the pusher dogs 60 of power chain 61, is as indicated by the arrow in Fig. 11. The upper I-beam track for the chain trolleys 62 serves as a support for two elongated rocker arm members, both pivoted on horizontal axes by an elongated cross brace 163 of inverted U-shaped outline (Fig. 13) which is welded or otherwise secured at its midpoint to extend across the top flange of the track 13. One of these arms, designated 164, is a yoke-like operating member in the general outline of an inverted U, the arms 165 of which are straight, as seen in Fig. 11, but brought inwardly toward one another at their lower portions 166, as seen in Fig. 13. The operating member 164 is pivoted on the downturned portions 167 of the cross brace 163 by means of a pair of studs 168, or the like, and its lower inturned arm portions each journal a roller 169 extending inwardly thereof. These rollers are adapted to be engaged successively, by the pusher dogs 60 of the power chain 61, as shown in Figs. 11 and 13, thus to rock the operating yoke 164 counterclockwise about its pivot at 168, i.e., from the solid line position of Fig. 11 to the dotted line position. A stop 169' on the cross brace 163 limits clockwise movement about the yoke pivot 168.

Upwardly of its pivot studs 168, the arm 165 of yoke 164 receive therebetween an elongated guide sleeve 170, through which an elongated pivot pin 171 extends outwardly of one of the yoke arms 165, the pin 171 serving as a bearing for a small operating roller 172, and being braced in this area by an auxiliary outer plate 173 and a spacer 174 adjacent the top of the yoke.

A draw bar 175 acts in the space between the yoke arm 165 and the plate 173. Draw bar 175 is connected at its right hand end, as seen in Fig. 11, with a pull rod 176, whose purpose is the same as the push rod 84 of the embodiment of empty place spotter 14 of Figs. 1, 6 and 7. Accordingly, it will be necessary to connect the same to pull rod 90 through a bell crank arrangement such as is shown in Fig. 13A. This is similar to what is shown in Figs. 1, 6 and 7, save that a tensioning of rod 176 is effective to tension the rod 90 leading to the stop and release mechanism 16. Hence corresponding bell crank parts are designated in Fig. 13A by corresponding reference numerals, primed.

The draw bar 175 is formed on its bottom with a notch 177 of substantial size adapted to receive the operating roller 172 when the draw bar is in its lowered, dotted line position of Fig. 11. Accordingly, it is seen that the counterclockwise motion of yoke 164, under operation by the pusher dog 60 of power chain 61, will shift the draw bar 175 and pull rod 176 to the dotted line position, operating the stop and release mechanism 16, in the manner described above, to release a transfer track trolley T for advance to the re-entry zone 15. Draw bar 175, to the left of the notch 177, has its bottom further formed to provide a shallow recess 178 whose ends are inclined divergently for a purpose to be described.

The second member pivotally supported by the cross brace 163 on track 13 is a control member designated 180, best shown in Figs. 11 and 12. It is medially and pivotally supported on the brace 163, by means of a horizontal pin 181 and ball bearings 182.

Control member 180 is a rigid strap in the form of a mildly angled bell crank. Its lower arm portion beneath pivot pin 181 is inclined inwardly at 183 toward the main line trolley tracks 34 and carries an anti-friction tappet roller 184 on its inner side. This roller is adapted to be engaged, in its dotted line position of Fig. 11, first by one of the forward load rollers 42 of an advancing trolley T, and an instant later by one of the trailing load rollers 42 of the trolley, thus to swing the control arm or member 180 counterclockwise about its pivot at 181 to the solid line position. The movement correspondingly swings the upper arm portion 185 of control arm 180 from the dotted to the solid line position of Fig. 11. The arm portion 185 is provided on its outer side with an anti-friction cam roller 186, which roller continuously rides the cam recess 178 of the draw bar 175.

Thus it is seen that, with a power chain dog 60 occupied by and propelling a trolley T along the track members 34, the control arm 180 upon engagement of its roller 184 with the trailing trolley load roller 42, as shown in Fig. 11, will cammingly engage its roller 186 with the draw bar and elevate the same from the dotted line to the solid line position of Fig. 11. This raises the draw bar to a position to disengage its notch 177 relative to the path of movement of the operating roller 172 on yoke 164; so that the normal counterclockwise swing of the yoke by the dog 160 is ineffective to transmit motion to the draw bar 175 and pull rod 176. No conditioning signal is transmitted to the stop and release mechanism 16, and the tappet roller 184 simply rides out of engagement with the pusher dog 40 of trolley T in reaching its dotted line position. Upon engagement of the arm roller 184 by a leading trolley load roller 42, the roller 184 simply rides over the latter, then returns to its solid line position of Fig. 11. No action is imparted to pull rod 176, since the power chain dog 60 has not yet reached a position to engage and swing the arm 164.

A coil tension spring 188 is anchored at its opposite ends to pins 189 and 190 on the control arm 180 and operating yoke member 164, respectively, in a manner to urge these two members both clockwise. Such movement of the control arm 180 is limited by a stop block or lug 191 on a side of the cross brace 163. The inclination of the ends of the cam recess 178 of draw bar 175, as at 192, is for the purpose of imparting a more abrupt lift to the latter as the tappet roller 184 clears the trolley load roller. The arm 180 and yoke 164 are, of course, returned to dotted line position of Fig. 11 by spring 188 when the trolley T has passed.

In view of the detailed explanation of the operation of the various components, units or sub-assemblies of the system, it is not believed that further extended description of the operation of the system as a whole is required. The endless transfer conveyor 17 is driven continuously and in a positive fashion by caterpillar engagement of its drive lugs 107 with the links of the main power chain 61, as shown in Fig. 14; and if the power chain halts, as from a power or operating failure, the transfer chain halts also, with no possibility of jamming of trolleys at the re-entry zone 15. The transfer chain is guided with minimum friction and without recourse to any driving or idler sprocket provisions by the track formation 36 of the unitary track and trolley plate 20, signifying a substantially lessened cost of production without any diminution of efficiency.

The same unitary track structure controls the movements of the pusher dogs 112 of transfer conveyor 17 in engaging and disengaging a trolley T waiting on the transfer track; and there is positive assurance given by the hold-down rail 118 that the dogs 112 will be depressed for action when and only when they are needed for propelling duty. Track cam 116 elevates the dog 112 of the conveyor as it rounds the track reach 23, thus insuring against possible side collision with a free trolley approaching the stop and release zone along track 12. Once the reach 23 has been rounded, the dog 112 may drop down, or be lowered by cam portion 119, without risk, since the trolley dogs 40 will yield if engaged from above by the descending conveyor dog 112.

This need is determined and satisfied, respectively, by the main track empty place spotter mechanism 14 (or 14') and the transfer track stop and release mechanism 16 (or 16'). If a trolley T is not being propelled by an advancing main line power chain dog 60, that dog signals its lack of a trolley by occasioning a tensioning of the pull rod 90. The pull rod operates the yoke 97 and bell crank 132 (Fig. 10) to first elevate trolley stop roller 123' from obstructing relation to the trolley T and elevate the tongue-like cam 101 to dotted line position (Fig. 8). The former action involves the lifting of the hook member 129 by bell crank arm 131, and if no trolley is present at the stop and release mechanism 16, the hook member will miss engagement with the lug 128 on arm 125. If the main line dog is occupied by a trolley, the stop roller 123' remains in solid line position.

As a subordinate feature, as a trolley T approaches and enters the stop and release zone, the anti-rebound back stop mechanism 18 or 18' of either Figs. 1 and 16 or Fig. 17 serves to hold it at this station for pick up by a dog 112 of the transfer conveyor 17. If a signal has not been received from the empty place spotter, cam 101 remains lowered, the follower roller 114 of the dog rides up the same, elevating its pusher foot 113, and the trolley remains halted at the stop and release unit.

It will be recognized from the description of the respective empty place spotter mechanisms of Figs. 1, 6 and 7 and Figs. 11, 12 and 13 that both operate on the same general principle of dual arm control, through actuation by load units and conveyor dogs, as is followed in the copending application of Paul Klamp, Serial No. 682,797, filed September 9, 1957, to a "Sub-Floor Conveyor System." Under such control a signaling movement regarding the presence or absence of a load unit is forwarded or not in response to the dual arm action.

A divisional application of application Serial No. 682,797, identified as Serial No. 851,651, filed November 9, 1959, relates to the empty place spotter improvements.

What we claim as our invention is:

1. A transfer mechanism to control the advance of trolleys or like load units from a first longitudinal track to its zone of entry to a second track communicating therewith at an angle, for advance of said units along said second track by a second conveyor moving generally parallel to said second track at said entry zone, said mechanism comprising an endless transfer conveyor traveling in convergent relation to said second conveyor at said entry zone and driven in synchronism therewith through a horizontal path of travel, said transfer conveyor having means to engage and propel load units, a fixed track structure having means providing an elongated surface serving as substantially the sole means to support and guide said transfer conveyor for said travel, and a generally horizontal track member supporting load units propelled by said transfer conveyor and extending angularly into said entry zone, said last named means including a conveyor track way upon which said transfer conveyor is supported for travel along a substantial portion of its endless path.

2. A transfer mechanism to control the advance of trolleys or like load units from a first longitudinal track to its zone of entry to a second track communicating therewith at an angle, for advance of said units along said second track by a second conveyor moving generally parallel to said second track at said entry zone, said mechanism comprising an endless transfer conveyor traveling in convergent relation to said second conveyor at said entry zone and driven in synchronism therewith through a horizontal path of travel, a fixed track structure having means providing an elongated surface serving as substantially the sole means to support and guide said transfer conveyor for said travel about an orbital path, and a generally horizontal track member supporting load units, said track structure constituting a part of said first track extending angularly into said entry zone, and including a conveyor track way providing a portion of said elongated surface upon which said transfer conveyor is supported for travel along a substantial portion of its endless path, said transfer conveyor being provided with longitudinally spaced dogs movably mounted thereon to releasably engage and drive load units on said track member.

3. A transfer mechanism to control the advance of trolleys or like load units from a first longitudinal track to its zone of entry to a second track communicating therewith at an angle, for advance of said units along said second track by a second conveyor moving generally parallel to said second track at said entry zone, said mechanism comprising an endless transfer conveyor traveling in convergent relation to said second conveyor at said entry zone and driven in synchronism therewith through a horizontal path of travel, said transfer conveyor having means to engage and propel load units, a fixed track structure serving as substantially the sole means to support and guide said transfer conveyor for said travel, and including a plate-like section having a horizontal track member thereon supporting load units propelled by said transfer conveyor, said track structure constituting a part of said first track extending angularly into said entry zone, said section being bent to form an integral horizontal conveyor track way upon which said transfer conveyor is supported for travel along a substantial portion of its endless path.

4. A transfer mechanism to control the advance of trolleys or like load units from a first longitudinal track to its zone of entry to a second track communicating therewith at an angle, for advance of said units along said second track by a second conveyor moving generally parallel to said second track at said entry zone, said mechanism comprising an endless transfer conveyor traveling in convergent relation to said second conveyor at said entry zone and driven in synchronism therewith through a horizontal path of travel, and a fixed track structure serving as substantially the sole means to support and guide said transfer conveyor for said travel, and including a plate-like section having a horizontal track member thereon supporting load units, said track structure constituting a part of said first track extending angularly into said entry zone, said section being bent to form an integral horizontal conveyor track way having portions extending longitudinally thereof to converge horizontally to parallel relation to said first track and then diverge therefrom into said entry zone, upon which track way said transfer conveyor is supported for travel along a substantial portion of its endless path, and an inclined cam track on said track structure generally paralleling the convergent portion of said track way, said transfer conveyor being provided with longitudinally spaced dogs to engage and drive load units on said track member, said dogs being mounted for movement relative to said transfer conveyor into and out of position for driving engagement with said load units, said dogs having means riding said cam track to control their position to drive said load units.

5. A transfer mechanism to control the advance of trolleys or like load units from a first longitudinal track to its zone of entry to a second track communicating therewith at an angle, for advance of said units along said second track by a second conveyor moving generally parallel to said second track at said entry zone, said mechanism comprising an endless transfer conveyor traveling in convergent relation to said second conveyor at said entry zone and driven in synchronism therewith through a horizontal path of travel, and a fixed track structure serving as substantially the sole means to support and guide said transfer conveyor for said travel, and including a plate-like section having a horizontal track member thereon supporting load units, said track structure constituting a part of said first track extending angularly into said entry zone, said section being bent to form an integral horizontal conveyor track way having portions extending longitudinally thereof to converge horizontally to parallel relation to said first track and then diverge therefrom into said entry zone, upon which track way said transfer conveyor is supported for travel along a substantial portion of its endless path, a vertically inclined cam track on said track structure generally paralleling the convergent portion of said track way, and a hold-down rail on said structure above and paralleling the parallel and divergent portions of said track way, said transfer conveyor being provided with longitudinally spaced dogs to engage and drive load units on said track member, said dogs being mounted for vertical movement relative to said transfer conveyor into and out of position for driving engagement with said load units, said dogs having means riding said cam track to control their vertical position and means engaging said rail to hold the same in lowered position to drive said load units.

6. A transfer mechanism to control the advance of trolleys or like load units from a first longitudinal track to its zone of entry to a second track communicating therewith at an angle, for advance of said units along said second track by a second conveyor moving generally parallel to said second track at said entry zone, said mechanism comprising an endless transfer conveyor traveling in convergent relation to and driving engagement with said second conveyor and driven thereby in synchronism therewith through an orbital horizontal path of travel, a fixed track structure serving as substantially the sole means to support and guide said transfer conveyor for said travel, and including a horizontal track member thereon supporting load units, said track structure constituting a part of said first track extending angularly into said entry zone, and including a conveyor track way upon which said transfer conveyor is supported for travel along a substantial portion of its endless path, said transfer conveyor being provided with longitudinally spaced dogs to engage and drive load units on said track member, said dogs being mounted for movement relative to said transfer conveyor into and out of position for driving engagement with said load units, said dogs having means engaging said track structure to control their position to drive said load units, a stop and release mechanism adjacent said first track including first means movable into and out of position to engage and halt load units on the latter in a control zone to the rear of said entry zone and second means to move said conveyor dogs into and out of said driving position thereof, and an empty place spotter mechanism adjacent said second track and conveyor, said last named mechanism having means operatively connected to said stop and release mechanism and operated in response to the presence of a load unit on said second track to operate said stop and release mechanism, including means to more said first and second means of the latter respectively into load unit halting position and out of load unit driving position.

7. A transfer mechanism to control the advance of trolleys or like load units from a first longitudinal track to its zone of entry to a second track communicating therewith at an angle, for advance of said units along said second track by a second conveyor moving generally parallel to said second track at said entry zone, said mechanism comprising an endless transfer conveyor traveling in convergent relation to and driving engagement with said second conveyor and driven thereby in synchronism therewith through a horizontal path of travel, a fixed track structure serving as substantially the sole means to support and guide said transfer conveyor for said travel, and including a plate-like section having a horizontal track member thereon supporting load units, said track structure constituting a part of said first track extending angularly into said entry zone, said section being bent to form an integral horizontal conveyor track way having portions extending longitudinally thereof to converge horizontally to parallel relation to said first track and then diverge therefrom into said entry zone, upon which track way said transfer conveyor is supported for travel along a substantial portion of its endless path, a vertically inclined cam track on said track structure generally paralleling the convergent portion of said track way, and a hold-down rail on said structure above and paralleling the parallel and divergent portions of said track way, said transfer conveyor being provided with longitudinally spaced dogs to engage and drive load units on said track member, said dogs being mounted for vertical movement relative to said transfer conveyor into and out of position for driving engagement with said load units, said dogs having means riding said cam track to control their vertical position and engaging said rail to hold the same in lowered position to drive said load units, a stop and release mechanism adjacent said first track including first means movable into and out of position to engage and halt load units on the latter in a control zone to the rear of said entry zone and second means to move said conveyor dogs to vertically shift the latter into and out of said driving position thereof, and an empty place spotter mechanism adjacent said second track and conveyor, said last named mechanism having means operatively connected to said stop and release mechanism and operated in response to the presence of a load unit on said second track to operate said stop and release mechanism, including means to move said first and second means of the latter respectively into load unit halting position and out of load unit driving position.

8. A transfer mechanism to control the advance of trolleys or like load units from a first longitudinal track to a zone of entry to a second track communicating therewith at an angle, for advance of said units along said second track by a driven conveyor moving generally parallel to said second track at said entry zone, said mechanism comprising an endless transfer conveyor traveling in convergent driving engagement with said driven conveyor at said entry zone and driven thereby in synchronism therewith through a horizontal path of travel, a fixed track structure including a horizontal track member supporting load units and a horizontal conveyor track way upon which said transfer conveyor is supported for travel along a substantial portion of its endless path, said transfer conveyor being provided with longitudinally spaced dogs to engage and drive load units on said track member, said dogs being mounted for movement relative to said transfer conveyor into and out of position for driving engagement with said load units, a stop and release mechanism adjacent said first track operable to engage and halt load units on the latter in a control zone to the rear of said entry zone, said stop and release mechanism including a cam element at said control zone movable into and out of position in which it is engaged by a conveyor dog to shift the latter out of its driving position, and a stop member movable into and out of a position in which it engages and halts a load unit at said control zone, and an empty place spotter mechanism adjacent said second track and driven conveyor, said last named mechanism having means operatively connectted to said stop and release mechanism and operated in response to the presence of a load unit on said second track to operate said stop and release mechanism, including means to move said cam element and stop member of the latter out of their respective dog-engaged and load unit-halting positions.

9. A transfer mechanism to control the advance of trolleys or like load units from a first longitudinal track to a zone of entry to a second track communicating therewith at an angle, for advance of said units along said second track at a driven conveyor moving generally parallel to said second track at said entry zone, said mechanism comprising an endless transfer conveyor traveling in convergent driving engagement with said driven conveyor and driven thereby in synchronism therewith through a horizontal path of travel, a fixed track structure including a horizontal track member supporting load units, said track structure constituting a part of said first track extending angularly into said entry zone, and including a horizontal conveyor track way upon which said transfer conveyor is supported for travel along a substantial portion of its endless path, said transfer conveyor being provided with longitudinally spaced dogs to engage and drive load units on said track member, said dogs being mounted for movement relative to said transfer conveyor into and out of position for driving engagement with said load units, a stop and release mechanism adjacent said first track operable to engage and halt load units on the latter in a control zone to the rear of said entry zone, said stop and release mechanism including a cam element at said control zone movable into and out of a position in which it is engaged by a conveyor dog to shift the latter out of its driving position, and a stop member movable into and out of a position in which it engages and halts a load unit at said control zone, and an empty place spotter mechanism adjacent said second track and driven conveyor, said last named mechanism having means operatively connected to said stop and release mechanism and operated in response to the presence of a load unit on said second track to operate said stop and release mechanism, including means to move said cam element and stop member of the latter out of their respective dog-engaged and load unit-halting positions.

10. A transfer mechanism to control the advance of trolleys or like load units from a first longitudinal track to a zone of entry to a second track communicating therewith at an angle, for advance along said second track by a driven conveyor moving generally parallel to said second track at said entry zone, said mechanism comprising an endless transfer conveyor in driving engagement with said driven conveyor and driven thereby in synchronism therewith through a horizontal path of travel, and a fixed track structure serving as substantially the sole means to support and guide said transfer conveyor for said travel, said track structure including a horizontal track member supporting load units and a track way upon which said transfer conveyor is supported for travel along a substantial portion of its endless path, an inclined cam track on said track structure generally paralleling one portion of said track way, and a hold-down rail on said structure paralleling another portion of said track way, said transfer conveyor being provided with longitudinally spaced dogs to engage and drive load units on said track member, said dogs being mounted for vertical movement relative to said transfer conveyor into and out of position for driving engagement with said load units, said dogs riding said cam track to control their vertical position and engaging said rail to hold the same in lowered position to drive said load units.

11. A transfer mechanism to control the advance of trolleys or like load units for a first longitudinal track to a zone of entry to a second track communicating therewith at an angle, for advance along said second track by a driven conveyor moving generally parallel to said second track at said entry zone, said mechanism comprising an endless transfer conveyor in driving engagement with said driven conveyor and driven thereby in synchronism therewith through a horizontal path of travel, a fixed track structure serving as substantially the sole means to support and guide said transfer conveyor for said travel, said track structure including a horizontal track member supporting load units and a track way upon which said transfer conveyor is supported for travel along a substantial portion of its endless path, an inclined cam track on said track structure generally paralleling one portion of said track way, and a hold-down rail on said structure paralleling another portion of said track way, said transfer conveyor being provided with longitudinally spaced dogs to engage and drive load units on said track member, said dogs being mounted for vertical movement relative to said transfer conveyor into and out of position for driving engagement with said load units, said dogs riding said cam track to control their vertical position and engaging said rail to hold the same in lowered position to drive said load units, and a stop and release mechanism adjacent said first track including means operable to engage and halt load units on the latter in a control zone to the rear of said entry zone, and means beneath said hold-down rail movable into and out of a lowered position in which it is engaged by a conveyor dog to vertically shift the latter out of its driving position, said cam track being inclined vertically toward said control zone to lower said dogs in approaching the latter, said hold-down rail being recessed in said control zone to accommodate upward movement of said last named means of said stop and release mechanism.

12. A transfer mechanism to control the advance of trolleys or like load units from a first longitudinal track to a zone of entry to a second track communicating therewith at an angle, for advance along said second track by a driven conveyor moving generally parallel to said second track at said entry zone, said mechanism comprising an endless transfer conveyor in driving engagement with said driven conveyor and driven thereby in synchronism therewith through a horizontal path of travel, a fixed track structure serving as substantially the sole means to support and guide said transfer conveyor for said travel, said track structure including a horizontal track member supporting load units and a track way upon which said transfer conveyor is supported for travel along a substantial portion of its endless path, an inclined cam track on said track structure generally paralleling one portion of said track way, and a hold-down rail on said structure paralleling another portion of said track way, said transfer conveyor being provided with longitudinally spaced dogs to engage and drive load units on said track member, said dogs being mounted for vertical movement relative to said transfer conveyor into and out of position for driving engagement with said load units, said dogs riding said cam track to control their vertical position and engaging said rail to hold the same in lowered position to drive said load units, a stop and release mechanism adjacent said first track including means operable to engage and halt load units on the latter in a control zone to the rear of said entry zone, and means beneath said hold-down rail movable into and out of a lowered position in which it is engaged by a conveyor dog to vertically shift the latter out of its driving position, said cam track being inclined vertically toward said control zone to lower said dogs in approaching the latter, said hold-down rail being recessed in said control zone to accommodate upward movement of said last named means of said stop and release mechanism, and an empty place spotter mechanism adjacent said second track and driven conveyor, said last named mechanism having means operatively connected to said stop and release mechanism and operated in response to the presence of a load unit on said second track to operate said stop and release mechanism, including means to move said respective means of the latter out of their respective dog-engaged and load unit-halting positions.

13. Track structure upon which an endless chain type conveyor is guided for movement in a horizontal plane, comprising an integral upright plate-like section of substantial length having at least one curved reach portion coinciding with a part of the path of movement of said conveyor, said section being bent between its top and bottom to provide an elongated track way extending horizontally throughout substantially its entire length upon which said conveyor is guided and has substantially its sole means of support and control as to its path.

14. Track and control structure upon which an endless chain type conveyor is guided for movement in a horizonal plane, comprising an integral upright plate-like section of substantial length having at least one curved reach portion coinciding with a part of the path of movement of said conveyor, said section being bent between its top and bottom to provide an elongated track way extending horizontally throughout substantially its entire length upon which said conveyor is guided and has substantially its sole means of support and control as to its path, said section being further provided with a horizontally extending track member beneath said track way upon which load units propelled by said conveyor may ride.

15. Track structure upon which an endless chain type conveyor is guided for movement in a horizontal plane, comprising an upright plate-like section of substantial and finite length having at least one curved reach portion coinciding with a part of the path of movement of said conveyor, said section being bent between its top and bottom to provide an elongated track way extending horizontally throughout substantially its entire length upon which said conveyor is guided and has substantially its sole means of support and control as to its path, and a take-up device disposed between the ends of said section and provided with track means to continue the guiding support of said conveyor between the ends of said track way, said take-up device having means to yieldably sustain the same for movement in a general plane of said track way and against said conveyor to maintain tension in the latter.

16. Track and control structure upon which an endless chain type conveyor is guided for movement in a horizontal plane, comprising an upright plate-like section of substantial and finite length having at least one curved reach portion coinciding with a part of the path of movement of said conveyor, said section being bent between its top and bottom to provide an elongated track way extending horizontally throughout substantially its entire length upon which said conveyor is slidably guided and has substantially its sole means of support and control as to its path, said section being further provided with a horizontally extending track member beneath said track way upon which load units propelled by said conveyor may ride, and with horizontally extending cam and hold-down members above and paralleling said track way, and a take-up device disposed between the ends of said section and provided with track means to continue the support of said conveyor between the ends of said track way, said take-up device having means to yieldably sustain the same for movement in the general plane of said track way and against said conveyor to maintain tension in the latter.

17. In a mechanism to propel to a stop position trolleys or like load units traveling a generally horizontal track under driving engagement by a chain or like conveyor, halt the trolleys at said stop position and then release the same, the improvement comprising a device mounted for movement in a control zone adjacent said track, a stop member carried by said device for movement into and out of position to halt a load unit on said track at said stop position, an element movably mounted on said stop member and engageable by a load unit to shift the element into an operative position, and an arm on said device movable with the same and provided with means engageable with said element, in the operative position of the latter, to shift said element and stop member in a way to move the latter out of said halting position.

18. In a mechanism to propel to a stop position trolleys or like load units traveling a generally horizontal track under driving engagement by a chain or like conveyor, halt the trolleys at said stop position and then release the same, the improvement comprising a device mounted for movement in a control zone adjacent said track, a stop member carried by said device for movement into and out of position to halt a load unit on said track at said stop position, an element movably mounted on said stop member and engageable by a load unit to shift the element into an operative position, an arm on said device movable with the same and provided with means engageable with said element, in the operative position of the latter, to shift said element and stop member in a way to move the latter out of said halting position, a cam member mounted for movement with said device into and out of operative position in which it is engaged to place said conveyor out of driving engagement with a load unit in said control zone, and means to operate said device to substantially simultaneously move said stop member out of said halting position and said cam member out of said operative position.

19. In a mechanism to propel to a stop position trolleys or like load units traveling a generally horizontal track under driving engagement by a chain or like conveyor, halt the trolleys at said stop position and then release the same, the improvement comprising a device mounted for pivotal movement in a vertical plane in a control zone adjacent said track, a stop member carried by said device for vertical movement into and out of position to halt a load unit on said track at said stop position, an element pivotally mounted on said stop member and engageable by a load unit to shift the element vertically into an operative position, an arm on said device pivotally movable with the same and provided with means engageable with said element, in the operative position of the latter, to shift said element and stop member vertically in a way to move the latter out of said halting position, a cam member mounted for movement with said device into and out of operative position in which it is engaged to place said conveyor out of driving engagement with a load unit in said control zone, and means to operate said device to substantially simultaneously move said stop member out of said halting position and said cam member out of said operative position.

20. In a mechanism to propel to a stop position trolleys or like load units traveling a generally horizontal track under driving engagement by a chain or like conveyor, halt the trolleys at said stop position and then release the same, the improvement comprising a device mounted for movement in a control zone adjacent said track, a stop member carried by said device for movement into and out of position to halt a load unit on said track at said stop position, an element movably mounted on said stop member and engageable by a load unit to shift the element into an operative position, an arm on said device movable with the same and provided with means engageable with said element, in the operative position of the latter, to shift said element and stop member in a way to move the latter out of said halting position, a cam member mounted for vertical movement with said device into and out of operative position in which it is engaged to place said conveyor out of driving engagement with a load unit in said control zone, and means to operate said device to substantially simultaneously move said stop member out of said halting position and said cam member out of said operative position, said conveyor being provided with dogs movable relative thereto to effect said driving engagement with the load unit and engageable with said cam member to move the dogs out of such engagement.

21. An empty place spotter and control mechanism having means to mount the same adjacent the path of a moving conveyor to signal the presence of a load unit being propelled by a pusher or like member of said conveyor, and a device operated by said mechanism, said mechanism including first and second arms operatively positioned rearwardly and forwardly of one another in the direction of conveyor movement, and otherwise differently positioned in respect to the path of such movement, for their respective mutually exclusive engagement and resulting movement by a conveyor-propelled load unit and by a conveyor member, and means operatively connected to said arms and to said operated device and selectively actuated respectively upon movement of one or both of said arms to govern operation of said device.

22. Mechanism in accordance with claim 21 in which said mounting means comprises a yoke swingable in a vertical plane to one side of said conveyor, upon which yoke said arms are mounted for horizontal swinging movement, and latch means releasably engaged by said first arm to hold the same in position for engagement by a load unit, thereby to releasably hold said yoke and said second arm in operative position for engagement of the latter by a conveyor member, and a further member engageable by a load unit and operatively connected to said yoke to restore said first arm, after release thereof, to engagement by said latch means.

23. An empty place spotter and control mechanism having means to mount the same adjacent the path of a moving conveyor to signal the presence of a load unit being propelled by a pusher or like member of said conveyor, and a device operated by said mechanism, said mechanism including first and second arms operatively positioned rearwardly and forwardly of one another in the direction of conveyor movement, and otherwise differently positioned in respect to the path of such movement, for their respective mutually exclusive engagement and resulting movement by a conveyor-propelled load unit and by a conveyor member, and means operatively connected to said arms and to said operated device and selectively actuated respectively upon movement of one or both of said arms to govern operation of said device, one of said arms being connected to said last named means to operate the latter upon movement of said arm alone, the other arm, upon its engagement and movement by a load unit, acting on said last named means to nullify operation thereof.

24. Mechanism in accordance with claim 23 in which said mounting means comprises a yoke swingable in a vertical plane to one side of said conveyor, upon which yoke said arms are mounted for horizontal swinging movement, and latch means releasably engaged by said first arm to hold the same in position for engagement by a load unit, thereby to releasably hold said yoke and said second arm in operative position for engagement of the latter by a conveyor member, and a further member engageable by a load unit and operatively connected to said yoke to restore said first arm, after release thereof, to engagement by said latch means.

25. An empty place spotter and control mechanism having means to mount the same adjacent the path of a moving conveyor to signal the presence of a load unit being propelled by a pusher or like member of said conveyor, said mechanism including first and second arms operatively positioned rearwardly and forwardly of one another in the direction of conveyor movement, and otherwise differently positioned in respect to the path of such movement, for their respective mutually exclusive engagement and resulting movement by a conveyor-propelled load unit and by a conveyor member, a conveyor control device in the form of a stop and release unit acting to control travel of load units along another path converging with said first named path, and means operatively connected to said arms and to said control device and selectively actuated respectively upon movement of one or both of said arms to govern operation of said control device, said second arm being connected to said last named means to operate the latter upon movement of said second arm alone, said first arm, upon its engagement and movement by a load unit, acting on said last named means to nullify operation thereof.

26. Mechanism in accordance with claim 25 in which said mounting means comprises a yoke swingable in a vertical plane to one side of said conveyor, upon which yoke said arms are mounted for horizontal swinging movement and latch means releasably engaged by said first arm to hold the same in position for engagement by a load unit, thereby to releasably hold said yoke and said second arm in operative position for engagement of the latter by a conveyor member.

27. Mechanism in accordance with claim 25 in which said mounting means comprises a yoke swingable in a vertical plane to one side of said conveyor, upon which yoke said arms are mounted for horizontal swinging movement, and latch means releasably engaged by said first arm to hold the same in position for engagement by a load unit, thereby to releasably hold said yoke and said second arm in operative position for engagement of the latter by a conveyor member, and a further member engageable by a load unit and operatively connected to said yoke to restore said first arm, after release thereof, to engagement by said latch means.

28. An empty place spotter and control mechanism adapted to be positioned adjacent the path of a moving conveyor to signal the presence of a load unit being propelled by a pusher or like member of said conveyor, said mechanism including means to mount control and operating arms adjacent said path for engagement and movement, in the order named, by a conveyor-propelled load unit alone and by a conveyor member alone, a device acting to control travel of load units along another path converging with said first named path, and means operatively connected to said control device and selectively actuated by said mechanism upon movement of said respective arms to govern operation of said control device, including a bar member movable into and out of position for engagement and actuation by said operating arm when the latter is moved by a conveyor member, said bar member being cammingly engaged by said control arm to move it out of said position and clear of said operating arm when said control arm is moved by a load unit.

29. A transfer control mechanism for a conveyor system by which load units are transferred from one track to a further track in convergent relation thereto at an entry zone, said system being characterized by continuously moving conveyors paralleling said respective tracks and having members thereon engageable with load units on the respective tracks to propel the latter, said control mechanism comprising a device to which load units are positively propelled on said first named track by the conveyor thereof, and by which device a trolley thus propelled is halted pending subsequent release and propulsion by said last named conveyor to said further track, said device including a stop member engageable by a load unit so propelled to the device to halt the unit, a movable element engageable by said load unit in the stoppage of the latter to shift said element into an operative position, a movable arm having means engageable with and moving said element, in said operative position of the latter, upon actuation of said arm, said element moving said stop member out of unit halting position in so moving, and means operatively connected to said arm and operated by a load unit engaging member of the conveyor of said further track to actuate said arm.

30. A transfer control mechanism for a conveyor system by which load units are transferred from one track to a further track in convergent relation thereto at an entry zone, said system being characterized by continuously moving conveyors paralleling said respective tracks and having members thereon engageable with load units on the respective tracks to propel the latter, said control mechanism comprising a device to which load units are positively propelled on said first named track by the conveyor thereof, and by which device a trolley thus propelled is halted pending subsequent release and propulsion by said last named conveyor to said further track, said device including a stop member engageable by a load unit so propelled to the device to halt the unit, a movable element mounted on said stop member for movement relative thereto and engageable by said load unit in the stoppage of the latter to shift said element into an operative position, a movable arm having means engageable with and moving said element, in said operative position of the latter, upon actuation of said arm, said element moving said stop member out of unit halting position in so moving, and means operatively connected to said arm and operated by a load unit engaging member of the conveyor of said further track to actuate said arm.

31. A conveyor system comprising a main trolley track, power driven members traveling adjacent and in the direction of said main track to advance trolleys therealong, a branch track converging relative to said main track in a predetermined zone, and an entrance mechanism to effect a properly timed and positive advance and entry of a trolley on said branch track to said zone of convergence of said main and branch tracks and to said main track, for further advance on the main track by one of said trolley advancing members, said mechanism comprising a transfer conveyor adjacent said branch track continuously driven in convergent relation toward said path of travel of said trolley advancing members of the main track; said transfer conveyor having means movable relative thereto into and out of engagement with a part of a trolley on said branch track to positively advance said trolley to said zone of convergence and to said main track for said engagement by one of said trolley advancing members, a control device located adjacent to and to one side of said branch track and transfer conveyor, said device having means to engage and halt a trolley traveling on said branch track, and means to move said movable means out of engagement with said trolley part upon halting of the trolley by the control device, a signal device disposed adjacent and to one side of said main track at a point passed by said trolley advancing members of the main track in approaching said zone of convergence of said tracks, said signal device being operable by said trolley advancing members and by trolleys traveling on said main track toward said zone of convergence, and means operatively connecting said signal and control devices to one another, said connecting means being responsive to operation of said signal device to cause said trolley engaging and halting means of said control device to halt a trolley and said movable means to move out of said engagement with said part of a trolley, or to permit said last named engagement, depending respectively upon whether said signal device is operated by both a trolley advancing member and a trolley traveling on said main track, or whether said signal device is operated by a trolley advancing member alone.

32. A transfer control mechanism for a conveyor system by which load units are transferred from a transfer track to a further track in convergent relation thereto at a transfer zone, said mechanism comprising driven conveyors having propelling members moving continuously adjacent and along said respective tracks, said conveyors being guided to cause said members to move in a common horizontal plane at said transfer zone, and in an accurate relationship of the propelling members of the respective conveyors to one another in reference to the direction of their travel at said zone, means driving said conveyors for accurately synchronized movement at said transfer zone, and control means to which said load units are positively driven by one of said conveyors acting to insure an accurately timed transfer of load units from said one track to said further track at said transfer zone.

33. A transfer control mechanism for a conveyor system by which load units are transferred from a transfer track to a further track in convergent relation thereto at a transfer zone, said mechanism comprising driven conveyors moving continuously adjacent and along said respective tracks, each of said conveyors being provided with members to engage and positively propel said load units, which members are guided to move in a common horizontal plane at said transfer zone, and in an accurate relationship of the propelling members of the respective conveyors to one another in reference to the direction of their travel at said zone, means drivingly connecting said conveyors to one another for accurately synchronized movement at said transfer zone, with the propelling members of said transfer track conveyor predeterminedly preceding those of the other conveyor through said zone in a predetermined and accurate longitudinal spacing, and control means to which said load units are positively driven by one of said conveyors acting to insure an accurately timed transfer of load units from said one track to said further track at said transfer zone.

34. A transfer control mechanism for a conveyor system by which load units are transferred from a transfer track to a further track in convergent relation thereto at a transfer zone, said mechanism comprising driven conveyors moving continuously adjacent and along said respective tracks, each of said conveyors being provided with members to engage and positively propel said load units, which members are guided to move in common horizontal and vertical planes at said transfer zone, means drivingly connecting said conveyors to one another for accurately synchronized movement at said transfer zone, with the propelling members of said transfer track conveyor preceding those of the other conveyor through said zone in a predetermined and accurate longitudinal spacing, and means insuring an accurately timed transfer of load units from said one track to said further track at said transfer zone, comprising means to halt a load unit on said one track at a control zone in advance of said transfer zone, to which control zone said load unit is forwarded by a propelling member of the transfer track conveyor, means to disengage the load unit halted at said control zone from its positive driving engagement by said last named propelling member, and means to re-engage said load unit and a further propelling member of said last named conveyor in driving engagement for forwarding of the load unit to the transfer zone in accurately timed relation to the movement toward said zone of a propelling member of the conveyor of said further track.

35. A transfer control mechanism for a conveyor system by which load units propelled by a conveyor along one track are transferred to a further track in convergent relation at a transfer zone to said one track, said conveyor having means propelling said load units on said one track to a control device adjacent the latter, said device acting to accurately control the transfer at said transfer zone of a load unit from said one track to said further track, and comprising means to halt at said device a load unit thus propelled to said device by said conveyor, means to disengage the last named load unit from driving engagement by said conveyor, and means to re-engage said halted load unit in driving engagement with said conveyor for advance to the zone of convergence of said tracks.

36. A transfer control mechanism for a conveyor system by which load units propelled by a conveyor along one track are transferred to a further track in convergent relation at a transfer zone to said one track, said conveyor having longitudinally spaced members propelling said load units on said one track to a control device adjacent the latter, said device acting to accurately control the transfer at said transfer zone of a load unit from said one track to said further track, and comprising means to halt at said device a load unit thus propelled to said device by said conveyor, means to disengage the last named load unit from driving engagement by a propelling member of said conveyor, and means to re-engage said halted load unit in driving engagement with a further propelling member of said conveyor for advance to the zone of convergence of said tracks.

37. A transfer control mechanism for a conveyor system by which load units propelled by a conveyor along one track are transferred to a further track in convergent relation at a transfer zone to said one track, said conveyor having longitudinally spaced members propelling said load units on said one track to a control device adjacent the latter, said device acting to accurately control the transfer at said transfer zone of a load unit from said one track to said further track, and comprising means to halt at said device a load unit thus propelled to said device by said conveyor, means to disengage the last named load unit from driving engagement by a propelling member of said conveyor, and means to re-engage said halted load unit in driving engagement with a further propelling member of said conveyor for advance to the zone of convergence of said tracks, said halting means including a stop member engageable by a load unit so propelled to the device to halt the unit, a signal device operatively connected to said stop member and controlled by a conveyor traveling along said further track to move said stop member out of position to so halt a unit, and means to prevent movement of said stop member by said signal device out of said halting position in the absence of a load unit so halted by the stop member.

38. A transfer control mechanism for a conveyor system by which load units propelled by a conveyor along one track are transferred to a further track in convergent relation at a transfer zone to said one track, said conveyor having longitudinally spaced members propelling said load units on said one track to a control device adjacent the latter, said device acting to accurately control the transfer at said transfer zone of a load unit from said one track to said further track, and comprising means to halt at said device a load unit thus propelled to said device by said conveyor, means to disengage the last named load unit from driving engagement by a propelling member of said conveyor, and means to re-engage said halted load unit in driving engagement with a further propelling member of said conveyor for advance to the zone of convergence of said tracks, said halting means including a stop member engageable by a load unit so propelled to the device to halt the unit, a signal device operatively connected to said stop member and controlled by a conveyor traveling along said further track to move said stop member out of position to so halt a unit, and means to prevent movement of said stop member by said signal device out of said halting position in the absence of a load unit so halted by the stop member, said disengaging means including means operative under control of said last named means to move a propelling member of the conveyor of said one track out of position to engage a load unit in the absence of operation of said stop member by said signal device.

39. An empty place spotter and control mechanism having means to mount the same adjacent the path of a moving conveyor to signal the presence of a load unit being propelled by a pusher or like member of said conveyor, and a device operated by said mechanism, said mechanism including first and second arms operatively positioned rearwardly and forwardly of one another in the direction of conveyor movement, for their respective engagement and resulting movement by a conveyor-propelled load unit and by a conveyor member, and means operatively connected to said arms and to said operated device and selectively actuated upon movement of said second arm to govern operation of said device, said mounting means comprising a yoke swingable in a vertical plane to one side of said conveyor, upon which yoke said arms are mounted for horizontal swinging movement, and latch means releasably engaged by said first arm to hold the same in position for engagement by a load unit, thereby to releasably hold said yoke and said second arm in operative position for engagement of the latter by a conveyor member, and a further member engageable by a load unit and operatively connected to said yoke to restore said first arm, after release thereof, to engagement by said latch means.

40. An empty place spotter and control mechanism having means to mount the same adjacent the path of a moving conveyor to signal the presence of a load unit being propelled by a pusher or like member of said conveyor, and a device operated by said mechanism, said mechanism including first and second arms operatively positioned rearwardly and forwardly of one another in the direction of conveyor movement, for their respective engagement and resulting movement by a conveyor-propelled load unit and by a conveyor member, and means operatively connected to said arms and to said operated device and selectively actuated upon movement of said second arm to govern operation of said device, said second arm being connected to said last named means to operate the latter upon movement of said second arm alone, the first arm, upon its engagement and movement by a load unit, acting on said last named means to nullify operation thereof, said mounting means comprising a yoke swingable in a vertical plane to one side of said conveyor, upon which yoke said arms are mounted for horizontal swinging movement, and latch means releasably engaged by said first arm to hold the same in position for engagement by a load unit, thereby to releasably hold said yoke and said second arm in operative position for engagement of the latter by a conveyor member, and a further member engageable by a load unit and operatively connected to said yoke to restore said first arm, after release thereof, to engagement by said latch means.

41. A transfer control mechanism for a conveyor system by which load bearing trolleys each equipped with a propelling dog are transferred from one track to a further track in convergent relation thereto at a transfer zone, said mechanism comprising driven conveyors having longitudinally spaced propelling members moving continuously adjacent and along said respective tracks, means to guide said conveyors for movement of the respective members thereof through said transfer zone in position to engage said members of each thereof with said propelling dogs of the trolleys in passing through said zone, in an accurate relationship of the propelling members of the respective conveyors to one another in the direction of their travel at said zone, means driving said conveyors for accurately synchronized movement at said transfer zone, and control means to which said trolleys are positively driven by one of said conveyors, said control means acting to insure an accurately timed transfer of trolleys from said one track to said further track at said transfer zone.

42. A transfer control mechanism for a conveyor system by which load bearing trolleys each equipped with a propelling dog are transferred from one track to a further track in convergent relation thereto at a transfer zone, said mechanism comprising driven conveyors having longitudinally spaced propelling members moving continuously adjacent and along said respective tracks, means to guide said conveyors for movement of the respective members thereof through said transfer zone in position to engage said members of each thereof with said propelling dogs of the trolleys in passing through said zone, in an accurate relationship of the propelling members of the respective conveyors to one another in the direction of their travel at said zone, means driving said conveyors for accurately synchronized movement at said transfer zone, and control means to which said trolleys are positively driven by one of said conveyors, said control means acting to insure an accurately timed transfer of trolleys from said one track to said further track at said transfer zone, said control means comprising a device adjacent said one track having means to halt a trolley thus positively driven to said control means, means to disengage said propelling dog of said trolley and the propelling member of said one conveyor from driving relation to one another, and means to re-engage said dog with a following propelling member of said one conveyor for advance to said transfer zone, and means adjacent said further track controlled by trolleys and propelling members of the other conveyor traveling to said transfer zone to operate said device for said re-engagement in accordance with whether or not the last named propelling members bear loads.

43. A transfer control mechanism for a conveyor system by which load units propelled by a continuously moving conveyor along one track are transferred to a further track in convergent relation at a transfer zone to said one track, said conveyor having longitudinally spaced members movably mounted thereon adapted to engage and propel said load units on said one track to a control device adjacent the latter, said device acting to accurately control the transfer at said transfer zone of a load unit from said one track to said further track, and comprising means to halt at said device a load unit thus propelled to said device by said conveyor, means to disengage the last named load unit from driving engagement by said conveyor by moving a propelling member of the latter relative thereto out of propelling engagement with the load unit, and means to re-engage said halted load unit in driving engagement with a following propelling member of said conveyor for advance to the zone of convergence of said tracks.

44. A transfer control mechanism for a conveyor system by which load units propelled by a continuously moving conveyor along one track are transferred to a further track in convergent relation at a transfer zone to said one track, said conveyor having longitudinally spaced members movably mounted thereon adapted to engage and propel said load units on said one track to a control device adjacent the latter, said device acting to accurately control the transfer at said transfer zone of a load unit from said one track to said further track, and comprising means to halt at said device a load unit thus propelled to said device by said conveyor, means to disengage the last named load unit from driving engagement by said conveyor by moving a propelling member of the latter relative thereto out of propelling engagement with the load unit, and means to re-engage said halted load unit in driving engagement with a following propelling member of said conveyor for advance to the zone of convergence of said tracks, and an empty place spotter positioned adjacent said further track and operatively connected to said device to selectively prevent said re-engagement of said halted load unit and said following propelling member, upon operation of the spotter by a load unit traveling on said further track toward said transfer zone.

45. An empty place spotter and control mechanism having means to mount the same adjacent the path of a moving conveyor to signal the presence of a load unit, being propelled by a pusher or like member of said conveyor, and a device operated by said mechanism, said mechanism including first and second movable arms, means positioning said arms for the respective engagement and resulting movement of the first only by a load unit which is propelled by one of said members and of the second by a conveyor member only, and means operatively connected to said second arm and to said operated device to selectively control the latter, said first arm having means operatively connecting the same to said second arm to prevent said operation and movement of the latter.

46. An empty place spotter and control mechanism having means to mount the same adjacent the path of a moving conveyor to signal the presence of a load unit being propelled by a pusher or like member of said conveyor, and a device operated by said mechanism, said mechanism including first and second movable arms having means positioning the same respectively rearwardly and forwardly in reference to the direction of movement of said conveyor member, and for the respective engagement and operation of said first arm by a conveyor-propelled load unit only and of said second arm by a conveyor member only, said first arm having means operatively connecting the same with said second arm to control the further positioning of the latter in and out of position for such engagement and operation by said conveyor member and means operatively connected to said second arm and to said operated device and selectively actuated by the latter in response to said operation, said first arm being moved upon engagement by a load unit in a direction approximately normal to the path of movement of the propelled load unit.

47. A transfer mechanism to control the advance of trolleys or like load units from a first longitudinal track to its zone of entry to a second track communicating therewith at an angle, said mechanism comprising an endless transfer conveyor converging toward said first track and thereafter traveling in a reach paralleling said first track in advance of said entry zone, and a track structure controlling said transfer conveyor for said travel and having a horizontal track member supporting load units for said advance, said track structure including an inclined cam adjacent the zone of convergence of the conveyor and first track, and a longitudinally extending rail forwardly of said cam and paralleling said conveyor reach, said transfer conveyor being provided with longitudinally spaced dogs to engage and drive load units, said dogs being mounted for transverse movement on and relative to said transfer conveyor into and out of position for driving engagement with said load units, said dogs riding said cam to adjust their transverse position and thereby prevent undesired, non-driving engagement with a load unit on said first track in traversing said zone of convergence, said dogs thereafter engaging said rail to transversely place and hold the same in position to drive said load units.

48. A transfer mechanism to control the advance of trolleys or like load units from a first longitudinal track to its zone of entry to a second track communicating therewith at an angle, said mechanism comprising an endless transfer conveyor converging toward said first track and thereafter traveling in a reach paralleling said first track in advance of said entry zone, and a track structure controlling said transfer conveyor for said travel and having a horizontal track member supporting load units for said advance, said track structure including a horizontal track way upon which said transfer conveyor is supported for travel, an inclined cam adjacent the zone of convergence of the conveyor and first track, and a longitudinally extending rail forwardly of said cam and paralleling said conveyor reach, said transfer conveyor being provided with longitudinally spaced dogs to engage and drive load units, said dogs being mounted for transverse movement on and relative to said transfer conveyor into and out of position for driving engagement with said load units, said dogs riding said cam to adjust their transverse position and thereby prevent undesired, non-driving engagement with a load unit on said first track in traversing said zone of convergence, said dogs thereafter engaging said rail to transversely place and hold the same in position to drive said load units, and a further cam mounted for movement relative to said track structure and selectively engageable by said dogs to control movement of the same into or out of said driving position.

49. A conveyor transfer mechanism comprising an endless conveyor provided with object propelling members and movable in a horizontal plane, a track of substantial and finite length providing an elongated track way section upon which said conveyor is guided and has substantially its sole means of support and control as to its path, and a take-up device disposed between the ends of said section and provided with track means to continue the guiding support of said conveyor between the ends of said track way section, said take-up device having means to yieldably sustain the same for movement in the general plane of said track way section and against said conveyor to maintain tension in the latter.

50. A conveyor transfer mechanism comprising an endless conveyor provided with object propelling members and movable in a horizontal plane, a track of substantial and finite length having at least one curved reach portion coinciding with a part of the path of movement of said conveyor and providing an elongated track way section upon which said conveyor is guided and has substantially its sole means of support and control as to its path, a take-up device disposed between the ends of said section and provided with track means to continue the guiding support of said conveyor between the ends of said track way section, said take-up device having means to yieldably sustain the same for movement in the general plane of said track way section and against said conveyor to maintain tension in the latter, and cam members mounted in respectively fixed and movable relation to and along said track way section being in longitudinally spaced relation to one another and at opposite ends of said take-up device, to control the action of said object propelling members of said conveyor in traveling said track and said curved reach of the latter.

References Cited in the file of this patent

UNITED STATES PATENTS

| | | |
|---|---|---|
| 1,865,788 | Raymond | July 5, 1932 |
| 1,876,373 | Whitney | Sept. 6, 1932 |
| 1,917,836 | Haddlesay | July 11, 1933 |
| 2,309,587 | Hassler | Jan. 26, 1943 |
| 2,812,724 | King | Nov. 12, 1957 |
| 2,845,034 | Harrison | July 29, 1958 |
| 2,868,138 | Bishop et al. | Jan. 13, 1959 |
| 2,868,139 | Klamp | Jan. 13, 1959 |